US012647684B1

(12) United States Patent　(10) Patent No.: US 12,647,684 B1

Yu　(45) Date of Patent: Jun. 2, 2026

(54) CAMERA ACTUATOR HAVING LENS ASSEMBLY SUPPRESSING ROTATION BETWEEN IMAGE STABILIZER CARRIER AND AUTO FOCUS CARRIER BY USING COIL AND ELECTRONIC DEVICE INCLUDING THE CAMERA ACTUATOR

(71) Applicant: SAMSUNG ELECTRONICS CO., LTD., Suwon-si (KR)

(72) Inventor: Youngbok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 18/624,836

(22) Filed: Apr. 2, 2024

Related U.S. Application Data

(63) Continuation of application No. PCT/KR2024/003270, filed on Mar. 14, 2024.

(30) Foreign Application Priority Data

Mar. 16, 2023 (KR) ........................ 10-2023-0034630
May 10, 2023 (KR) ........................ 10-2023-0060423

(51) Int. Cl.
　*H04N 23/68*　(2023.01)
　*G03B 17/17*　(2021.01)
　(Continued)

(52) U.S. Cl.
　CPC ........... *H04N 23/687* (2023.01); *G03B 17/17* (2013.01); *H04N 23/51* (2023.01); *H04N 23/54* (2023.01)

(58) Field of Classification Search
　CPC ...... H04N 23/687; H04N 23/51; H04N 23/54; G03B 17/17
　See application file for complete search history.

(56) References Cited

U.S. PATENT DOCUMENTS 10,890,734 B1 * 1/2021 Sharma ................. H02P 25/034
10,976,567 B2 4/2021 Barak et al.
(Continued)

FOREIGN PATENT DOCUMENTS

EP 4 310 588 A1 1/2024
KR 10-2019-0061439 A 6/2019
(Continued)

OTHER PUBLICATIONS

International Search Report (PCT/ISA/210) dated Jun. 17, 2024, issued by the International Searching Authority in International Application No. PCT/KR2024/003270.

*Primary Examiner* — Padma Haliyur

(74) *Attorney, Agent, or Firm* — Sughrue Mion, PLLC

(57) ABSTRACT

An electronic device including a camera actuator according to an embodiment of the disclosure may include a camera housing, a lens assembly fixed to the camera housing and including at least one lens, an image stabilizer (IS) carrier, an auto focus (AF) carrier coupled to the IS carrier, an image sensor coupled to the IS carrier to change a location thereof according to a movement of the IS carrier, a first IS magnet disposed on a first lateral surface of the IS carrier, a second IS magnet disposed on a second lateral surface parallel to the first lateral surface, at least one coil surrounding the camera housing and changing an electromagnetic force of the first IS magnet and the second IS magnet by using a current. Various other embodiments are possible.

18 Claims, 18 Drawing Sheets

(51) Int. Cl.
    *H04N 23/51*           (2023.01)
    *H04N 23/54*           (2023.01)

(56)                 References Cited

U.S. PATENT DOCUMENTS

| | | | |
|---|---|---|---|
| 12,149,828 B1 * | 11/2024 | Shahparnia | .............. G03B 3/10 |
| 2019/0020822 A1 * | 1/2019 | Sharma | ................ G02B 27/646 |
| 2020/0363614 A1 * | 11/2020 | Kwon | ....................... G03B 5/00 |
| 2020/0371374 A1 | 11/2020 | Barak et al. | |
| 2021/0080807 A1 * | 3/2021 | Sharma | .................. G03B 13/36 |
| 2021/0116787 A1 * | 4/2021 | Hwang | .................... G03B 3/10 |
| 2021/0227141 A1 | 7/2021 | Seo et al. | |
| 2022/0165467 A1 * | 5/2022 | Son | ........................ G03B 30/00 |
| 2022/0247931 A1 * | 8/2022 | Mahmoudzadeh | ........................... H02K 41/0356 |
| 2023/0384649 A1 | 11/2023 | Lee | |

FOREIGN PATENT DOCUMENTS

| | | | |
|---|---|---|---|
| KR | 10-2020-0030129 A | 3/2020 | |
| KR | 10-2021-0034400 A | 3/2021 | |
| KR | 10-2021-0092572 A | 7/2021 | |
| KR | 10-2022-0030723 A | 3/2022 | |
| KR | 10-2022-0042828 A | 4/2022 | |
| KR | 10-2022-0090055 A | 6/2022 | |
| KR | 10-2022-0146215 A | 11/2022 | |
| WO | 2021/006373 A1 | 1/2021 | |

* cited by examiner

FIG. 12

CAMERA ACTUATOR HAVING LENS ASSEMBLY SUPPRESSING ROTATION BETWEEN IMAGE STABILIZER CARRIER AND AUTO FOCUS CARRIER BY USING COIL AND ELECTRONIC DEVICE INCLUDING THE CAMERA ACTUATOR

CROSS-REFERENCE TO RELATED APPLICATIONS

This application is a by-pass continuation application of International Application No. PCT/KR2024/003270, filed on Mar. 14, 2024, which is based on and claims priority to Korean Patent Application Nos. 10-2023-0034630, filed on Mar. 16, 2023, and 10-2023-0060423, May 10, 2023, in the Korean Intellectual Property Office, the disclosures of which are incorporated by reference herein their entireties.

BACKGROUND

1. Field

The disclosure relates to a camera actuator and an electronic device including same.

2. Detailed Description of Related Art

Various electronic devices (including a smart phone, a tablet PC, a portable multimedia player (PMP), a personal digital assistant (PDA), a laptop personal computer (PC)) and a wearable device (such as a wristwatch, a head-mounted display (HMD)) include a camera and those devices may capture images by using the camera.

When an electronic device captures an image by using a camera included in the electronic device, obtaining a clear image may require focusing and/or compensation for shake in an optical module. A camera actuator may control magnets disposed in each axis direction and an electromagnetic force between coils to adjust focusing, or match an optical axis with a virtual axis connecting a center of a camera assembly to correct shaking of the optical module.

The above-described information may be provided as related art to help understanding of the disclosure. No claim or determination is made as to the applicability of any of the foregoing as prior art to the disclosure.

SUMMARY

A camera actuator includes an intermediate guide between an auto focus (AF) carrier for automatic focus adjustment and an image stabilizer (IS) carrier for shaking correction, and thus there may be a limitation in reducing a size of the camera actuator.

A camera actuator and an electronic device including the camera actuator according to an embodiment of the disclosure may reduce a size of the camera actuator.

The technical aspects pursued in the disclosure may not be limited to the above mentioned technical subjects, and other technical aspects which are not mentioned may be clearly understood, through the following descriptions, by those skilled in the art to which the disclosure pertains.

The electronic device including the camera actuator according to an embodiment of the disclosure may include a camera housing and a lens assembly which is fixed to the camera housing and includes at least one lens.

The electronic device including the camera actuator according to an embodiment of the disclosure may include an image stabilizer (IS) carrier and an auto focus (AF) carrier that is coupled to the IS carrier.

The electronic device including the camera actuator according to an embodiment of the disclosure may include an image sensor coupled to the IS carrier to change a location of the IS carrier according to a movement of the IS carrier.

According to an aspect of the disclosure, an electronic device includes: a camera housing; a lens assembly fixed to the camera housing and comprising at least one lens; an image stabilizer (IS) carrier; an auto focus (AF) carrier coupled to the IS carrier; an image sensor coupled to the IS carrier, wherein a location of the image sensor is changed based on a movement of the IS carrier; a first IS magnet arranged on a first lateral surface of the IS carrier; a second IS magnet arranged on a second lateral surface of the IS carrier, the second lateral surface being parallel to the first lateral surface; and at least one coil configured to surround the camera housing, wherein an electromagnetic force between the first IS magnet and the second IS magnet is changed by a current passing through the at least one coil.

According to an aspect of the disclosure, a camera actuator includes: a camera housing; a lens assembly fixed to the camera housing and comprising at least one lens; an image stabilizer (IS) carrier; an auto focus (AF) carrier coupled to the IS carrier; an image sensor coupled to the IS carrier, wherein a location of the image sensor is changed based on a movement of the IS carrier; a first IS magnet arranged on a first lateral surface of the IS carrier; a second IS magnet arranged on a second lateral surface of the IS carrier, the second lateral surface being parallel to the first lateral surface; and at least one coil configured to surround the camera housing, wherein an electromagnetic force between the first IS magnet and the second IS magnet is changed by a current passing through the at least one coil.

Embodiments of the disclosure are not limited thereto. Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

The above and other aspects, features, and advantages of certain embodiments of the disclosure will be more apparent from the following description taken in conjunction with the accompanying drawings, in which:

FIG. 12 is a view illustrating a sectional view of a third camera actuator in FIG. 11 taken along a C-D direction.

DETAILED DESCRIPTION

Figure 1:
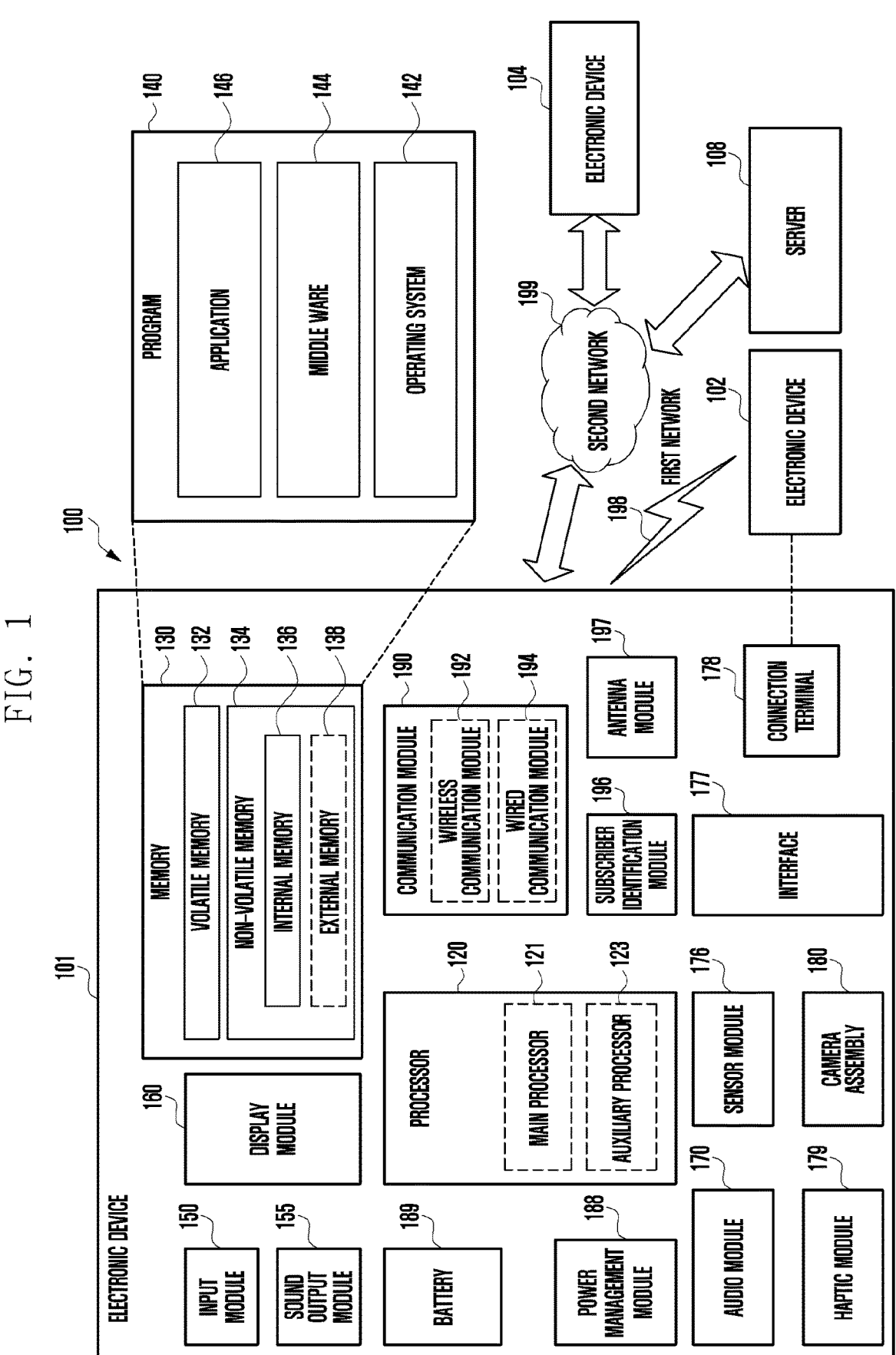
FIG. 1 is a block diagram illustrating an electronic device in a network environment according to one or more embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera assembly 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera assembly 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera assembly 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more of those artificial neural networks but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera assembly 180 may capture a still image or moving images. According to an embodiment, the camera assembly 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
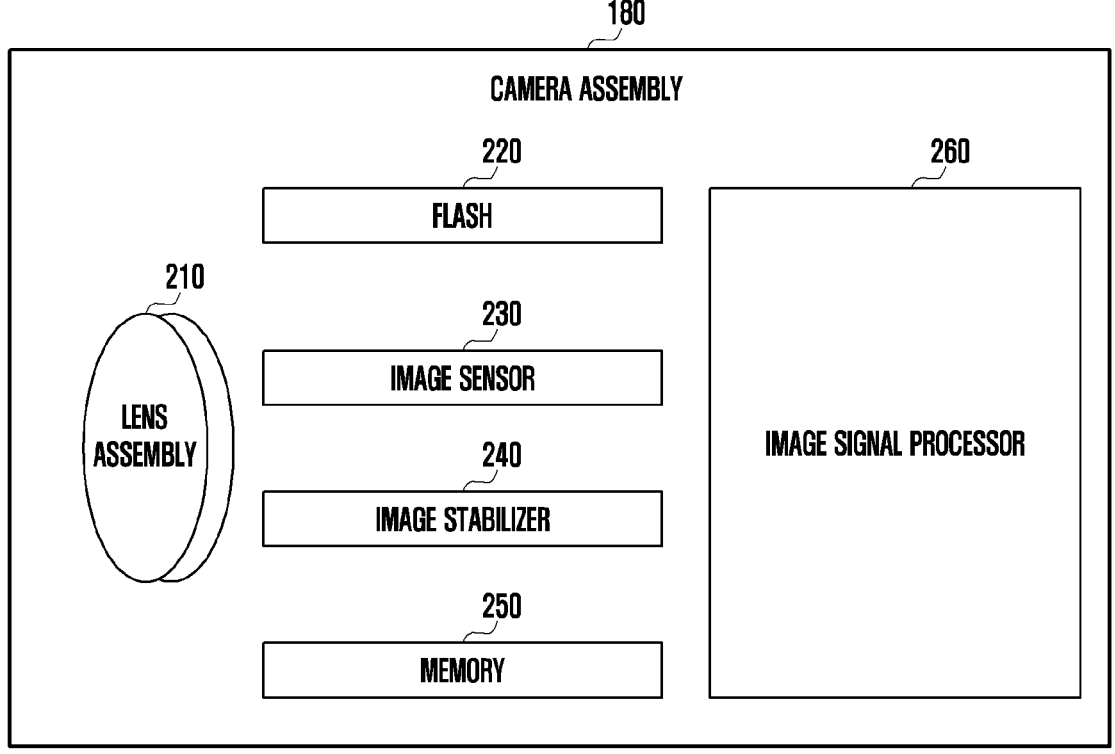
FIG. 2 is a block diagram illustrating a camera assembly according to one or more embodiments.

FIG. 2 is a block diagram illustrating the camera assembly 180 according to one or more embodiments. Referring to FIG. 2, the camera assembly 180 may include a lens assembly 210, a flash 220, an image sensor 230, an image stabilizer 240, a memory 250 (e.g., a buffer memory), or an image signal processor 260. The lens assembly 210 may collect light emitted from a subject which is a target to be image photographed. The lens assembly 210 may include one or more lenses. According to an embodiment, the camera assembly 180 may include multiple lens assemblies 210. Here, the camera assembly 180 may form, for example, a dual camera, a 360-degree camera, or a spherical camera. Some of the multiple lens assemblies 210 may have the same lens attribute (e.g., an angle of view, a focal length, an auto focus, an f-number, or an optical zoom), or at least one lens assembly may have one or more lens attributes other than lens attributes of other lens assembly. The lens assembly 210 may include, for example, a wide-angle or a telephoto lens.

The flash 220 may emit light used for reinforcing light emitted or reflected from a subject. According to an embodiment, the flash 220 may include one or more light-emitting diodes (e.g., a red-green-blue (RGB) LED, a white LED, an infrared LED, or an ultraviolet LED), or a xenon lamp. The image sensor 230 may convert light emitted or reflected from a subject and transferred through the lens assembly 210 into an electrical signal to obtain an image corresponding to the subject. According to an embodiment, the image sensor 230 may include one image sensor selected from image sensors having different attributes, such as an RGB sensor, a black and white (BW) sensor, an IR sensor, or a UV sensor, multiple image sensors having the same attribute, or multiple image sensors having different attributes. Each image sensor included in the image sensor 230 may be implemented by using, for example, a charged coupled device sensor (CCD) or a complementary metal oxide semiconductor (CMOS) sensor.

The image stabilizer 240 may move at least one lens included in the lens assembly 210 or the image sensor 230 in a predetermined direction or control (e.g., adjusting a lead-out timing and the like) operational characteristics of the image sensor 230, in response to movement of the camera assembly 180 or the electronic device 101 including the camera assembly 180. As such, shaking of an image caused by movement with respect to an image being photographed may be at least partially compensated. According to an embodiment, the image stabilizer 240 may detect such movement of the camera assembly 180 or the electronic device 101 by using a gyro sensor or an acceleration sensor disposed inside or outside the camera assembly 180. The memory 250 may store at least a portion of the image obtained through the image sensor 230 at least temporarily for a next image processing operation. For example, when an image obtainment is delayed due to a shutter or multiple images are obtained at high speed, the obtained original image (e.g., a Bayer-patterned image or an image having high resolution) is stored in the memory 250 and a copy image (e.g., an image having low resolution) corresponding thereto may be previewed through the display module 160. Thereafter, when a designated requirement is satisfied (e.g., a user input or system command), at least a portion of the original image stored in the memory 250 may be obtained and processed by, for example, the image signal processor 260. According to an embodiment, the memory 250 may include a separate memory operating as at least a portion of or operating independently from the memory 130.

The image signal processor 260 may perform one or more image processes with respect to the image obtained through the image sensor 230 or the image stored in the memory 250. The one or more image processes may include, for example, depth map generation, three-dimensional modeling, panorama generation, feature point extraction, image synthesis, or image compensation (e.g., noise reduction, resolution adjustment, brightness adjustment, blurring, sharpening, or softening). Additionally or alternatively, the image signal processor 260 may perform control (e.g., exposure time control or lead out timing control) with respect to at least one (e.g., the image sensor 230) of components included in the camera assembly 180. The image having been processed by the image signal processor 260 may be stored in the memory 250 again for an additional processing, or provided to an external component (e.g., the memory 130, the display module 160, an electronic device 102, an electronic device 104, or a server 108) of the camera assembly 180. According to an embodiment, the image signal processor 260 may be configured to be at least a portion of the processor 120, or a separate processor operating independently from the processor 120. When the image signal processor 260 is configured to be a processor separated from the processor 120, at least one image having been processed by the image signal processor 260 may be displayed through the display module 160 as is or after additional image processing by the processor 120.

According to an embodiment, the electronic device 101 may include multiple camera assemblies 180 each having a different attribute (e.g., angle of view) or function. In this case, for example, the multiple camera assemblies 180 may include at least one of a wide-angle camera, a telephoto camera, or an infrared (IR) camera (a time-of-flight camera, or a structured light camera). For example, multiple camera assemblies 180 including lenses having different angles of view may be configured and the electronic device may control an angle of view to be variably changed depending on a user's selection. According to an embodiment, at least one of the multiple camera assemblies 180 may be a front camera and at least another camera may be a rear camera.

Figure 3:
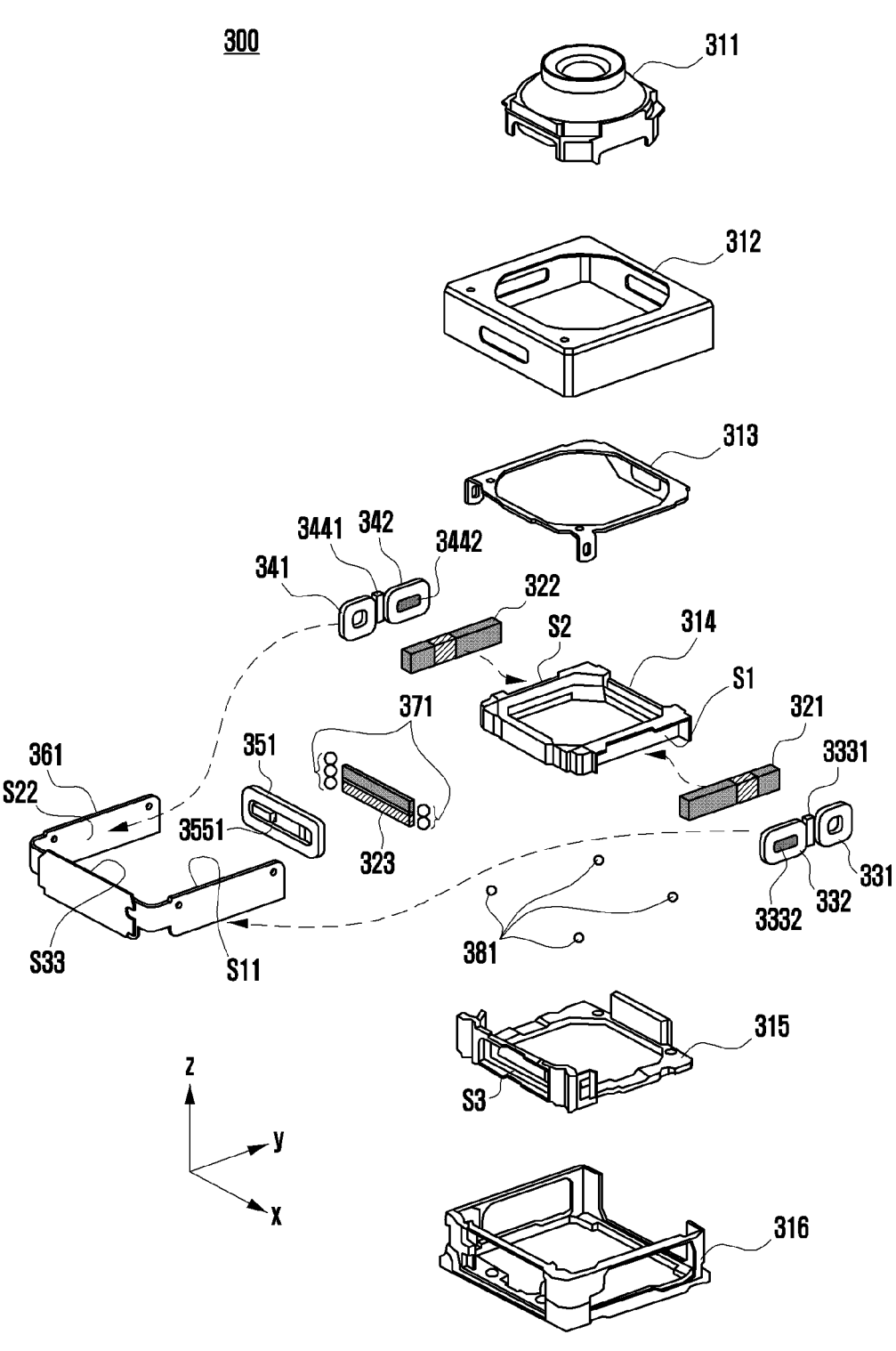
FIG. 3 is an exploded view illustrating a first camera actuator of an electronic device according to an embodiment of the disclosure.
Figure 4:
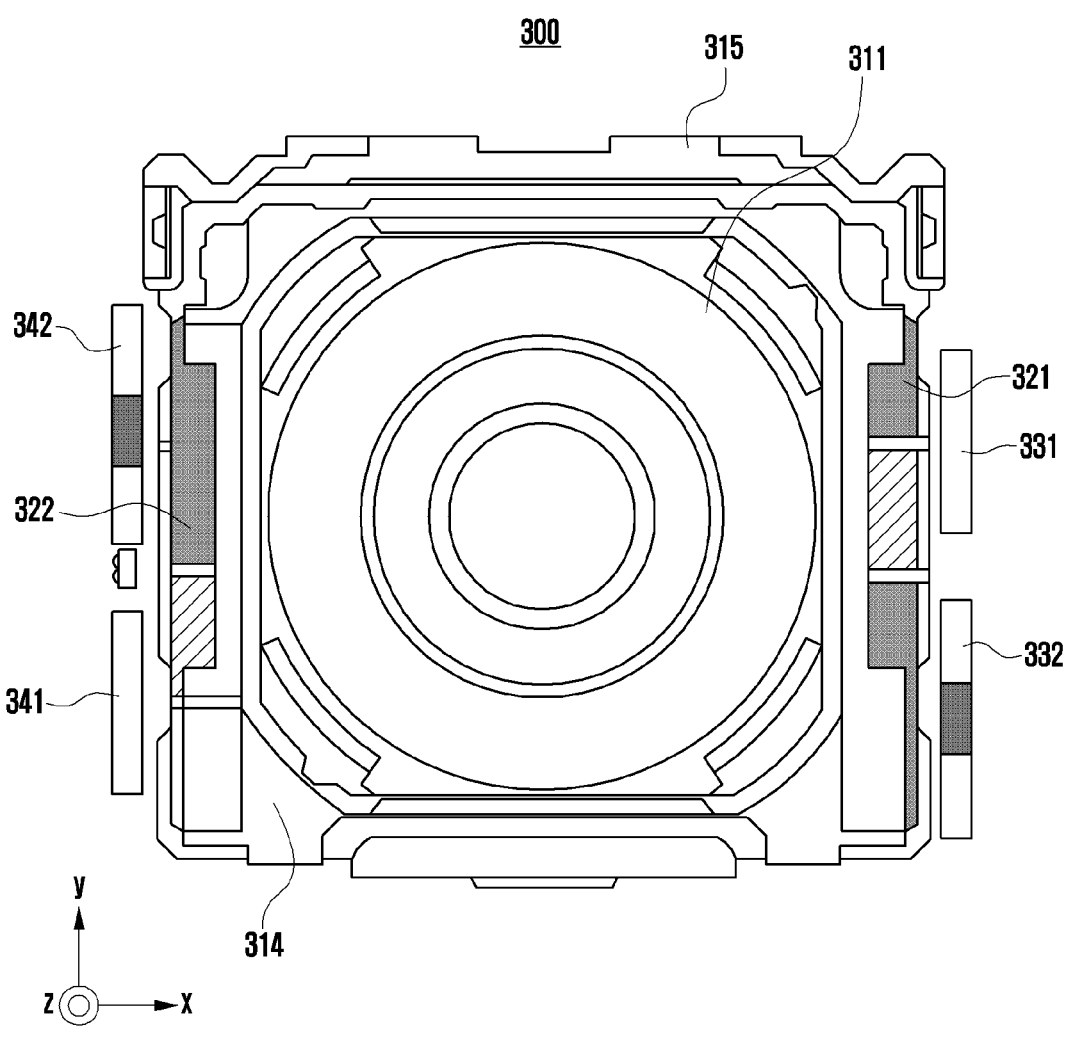
FIG. 4 is a view illustrating a first camera actuator of an electronic device viewed from above according to an embodiment of the disclosure.

FIG. 3 is an exploded view illustrating a first camera actuator 300 of an electronic device 101 according to an embodiment of the disclosure. FIG. 4 is a view illustrating a first camera actuator 300 of an electronic device 101 viewed from above according to an embodiment of the disclosure. In some embodiments, the first camera actuator 300 may be included in the camera assembly 180.

Referring to FIGS. 3 and 4, the first camera actuator 300 may include a first lens assembly 311, a first shield can 312, a first stopper 313, a first image stabilizer (IS) carrier 314, a first auto focus (AF) carrier 315, a first camera housing 316, a first image stabilizer (IS) magnet 321, a second IS magnet 322, a first auto focus (AF) magnet 323, a first image stabilizer (IS) coil 331, a second IS coil 332, a third IS coil 341, a fourth IS coil 342, a first auto focus (AF) coil 351, a first magnet detection sensor 3331, a second magnet detection sensor 3332, a third magnet detection sensor 3441, a fourth magnet detection sensor 3442, a first flexible printed circuit board (FPCB) 361, first multiple AF balls 371, and first multiple IS balls 381.

However, embodiments of the disclosure are not limited thereto, and the first camera actuator 300 may include at least three sensors from among the first magnet detection sensor 3331, the second magnet detection sensor 3332, the third magnet detection sensor 3441, and the fourth magnet detection sensor 3442.

In an embodiment, the first magnet detection sensor 3331, the second magnet detection sensor 3332, the third magnet detection sensor 3441, the fourth magnet detection sensor 3442, or a fifth magnet detection sensor 3551 may detect a location of a magnet (e.g., the first IS magnet 321, the second IS magnet 322, or the first AF magnet 323).

In an embodiment, the first camera actuator 300 may move, under a control of the processor 120, the first IS carrier 314 coupled to the first lens assembly 311 to maintain a captured image within a designated range, which is deviated from an optical axis of the first lens assembly 311 and a center axis (e.g., a center of an image sensor) of the first camera actuator 300.

In an embodiment, the first camera actuator 300 may move, under a control of the processor 120, the first AF carrier 315 to adjust a focus.

In an embodiment, the first lens assembly 311 may include at least one lens aligned and assembled in the first lens assembly 311. The first lens assembly 311 may correspond to a lens barrel in which at least one lens is assembled.

Referring to FIG. 4, the first lens assembly 311 may be controlled to suppress a rotation between the first IS carrier 314 and the first AF carrier 315 by using at least one coil (e.g., the first IS coil 331, the second IS coil 332, the third IS coil 341, or the fourth IS coil 342) symmetrically arranged on the optical axis.

In an embodiment, the first shield can 312 may be located at an outermost edge of the first camera actuator 300 and surround the first stopper 313, the first image stabilizer (IS) carrier 314, the first auto focus (AF) carrier 315, and the first camera housing 316.

In an embodiment, the first shield can 312 may block or reduce electromagnetic waves generated externally to reduce an occurrence of malfunctions of the first camera actuator 300.

In an embodiment, the first camera housing 316 may be located inside the first shield can 312. The first camera housing 316 may be coupled to or fitted into the first shield can 312.

In an embodiment, the first stopper 313 may be coupled to or fitted into the first AF carrier 315. The first stopper 313 may prevent the first IS carrier 314 from being separated from the first camera housing 316. In an embodiment, the first stopper 313 may be omitted.

In an embodiment, the first stopper 313 may include an opening corresponding to the first lens assembly 311. At least a portion of the first lens assembly 311 may move through the opening of the first stopper 313.

In an embodiment, the first IS carrier 314 may include the first IS magnet 321 and the second IS magnet 322 that are arranged symmetrically around a first axis (e.g., the y axis).

In an embodiment, the first IS carrier 314 may arrange the first IS magnet 321 and the second IS magnet 322 on both lateral sides of the first IS carrier 314, and thus, the first IS magnet 321 and the second IS magnet 322 face each other.

In an embodiment, the first IS carrier 314 may include an opening corresponding to the first lens assembly 311.

In an embodiment, the first IS carrier 314 may include the first IS magnet 321 and the second IS magnet 322 arranged on both lateral surfaces, respectively, around the first axis (e.g., the y axis).

However, embodiments of the disclosure are not limited thereto, and the first IS carrier 314 may include the first IS magnet 321 and the second IS magnet 322 arranged on both lateral surfaces, respectively, around a second axis (e.g., the x axis).

In an embodiment, each of the first IS magnet 321 and the second IS magnet 322 may correspond to a magnet having three poles (e.g., N pole-S pole-N pole or S pole-N pole-S pole) magnetized on one surface of the magnet. However, embodiments of the disclosure are not limited thereto, and each of the first IS magnet 321 and the second IS magnet 322 may correspond to a magnet having two poles (e.g., S pole-N pole) magnetized on one surface of the magnet.

In an embodiment, the first IS magnet 321 and the second IS magnet 322 may be arranged on both sides of the first IS carrier 314, respectively, around the first axis (e.g., the y axis) of the first IS carrier 314.

In an embodiment, the first IS magnet 321 may be arranged on a first lateral surface S1 of the first IS carrier 314 and the second IS magnet 322 may be arranged on a second lateral surface S2 of the first IS carrier 314.

In an embodiment, the first lateral surface S1 of the first IS carrier 314 and the second lateral surface S2 of the first IS carrier 314 may be substantially parallel to each other.

In an embodiment, the first IS magnet 321 and the second IS magnet 322 may be the same magnet. The first IS magnet 321 may be arranged in a same direction as the second IS magnet 322.

In an embodiment, the first IS magnet 321 and the second IS magnet 322 may be arranged in opposite directions.

In an embodiment, based on the first axis (e.g., the y axis) of the first IS carrier 314, the first IS magnet 321 (arranged on the first lateral surface S1 of the first IS carrier 314) and the second IS magnet 322 (arranged on the second lateral surface S2 of the first IS carrier 314) may have the same arrangement direction that may indicate that polarities of the magnets facing each other is the same.

In an embodiment, based on the first axis (e.g., the y axis) of the first IS carrier 314, the first IS magnet 321 (arranged on the first lateral surface S1 of the first IS carrier 314) and the second IS magnet 322 (arranged on the second lateral surface S2 of the first IS carrier 314) may have opposite arrangement directions.

In an embodiment, in a case that both the first IS magnet 321 and the second IS magnet 322 are a magnet having N pole-S pole-N pole, one of two N poles is relatively long and the other of two N poles may have the same length as the S pole.

For example, in a case that long N poles face each other, the first IS magnet 321 and the second IS magnet 322 may be arranged in the same direction. For example, in a case that the long N pole and the short N pole face each other, the first IS magnet 321 and the second IS magnet 322 may be arranged in opposite directions.

In an embodiment, the first IS carrier 314 may have both lateral surfaces S1 and S2 coupled to the first IS magnet 321 and the second IS magnet 322 and at least a portion of the first IS carrier 314 may be coupled to the first AF carrier 315. The first multiple IS balls 381 may be arranged between the first IS carrier 314 and the first AF carrier 315.

In an embodiment, the first multiple IS balls 381 may guide a movement of the first IS carrier 314 when the first IS carrier 314 is moved by an electromagnetic force between a magnet (e.g., the first IS magnet 321 and the second IS magnet 322) and a coil (e.g., the first IS coil 331, the second IS coil 332, the third IS coil 341, and the fourth IS coil 342).

In an embodiment, the first multiple IS balls 381 may guide a movement of the first IS carrier 314 in the x-axis direction and the y-axis direction or guide a rotation movement of the first IS carrier 314 on the x-y plane.

In an embodiment, the first multiple IS balls 381 may include at least three balls and may be arranged on locations corresponding to four corners of the first IS carrier 314, which is substantially square in shape. In an embodiment, each of the first multiple IS balls 381 may be a ball bearing.

In an embodiment, the first AF carrier 315 may include the first AF magnet 323 arranged on at least a portion of the first AF carrier 315. The first AF carrier 315 may include the first AF magnet 323 arranged on a third lateral surface S3. The third lateral surface S3 of the first AF carrier 315 may be located in a direction perpendicular to that of the first lateral surface S1 of the first IS carrier 314 and/or that of the second lateral surface S2 of the first IS carrier 314.

In an embodiment, the first AF magnet 323 may correspond to a magnet having two poles (e.g., S pole-N pole) magnetized on one surface of the magnet. The first IS magnet 321, the second IS magnet 322, and the first AF magnet 323 may have a shape of a bar magnet. The first IS magnet 321 and the second IS magnet 322 have magnet poles arranged in the y-axis direction, and the first AF magnet 323 may have magnet poles arranged in the z-axis direction.

In an embodiment, the first AF carrier 315 may be coupled to the first camera housing 316. The first multiple AF balls 371 may be arranged between the first AF carrier 315 and the first camera housing 316.

In an embodiment, the first multiple AF balls 371 may guide a movement of the first AF carrier 315 when the first AF carrier 315 is moved by an electromagnetic force between a magnet (e.g., the first AF magnet 323) and a coil (e.g., the first AF coil 351).

In an embodiment, the first multiple AF balls 371 may be respectively arranged on both lateral surfaces (e.g., both lateral surfaces in the x-axis direction) of the first AF magnet 323 around the first AF magnet 323.

In an embodiment, the first multiple AF balls 371 may guide a movement of the first AF carrier 315 in the z-axis direction. In an embodiment, each of the first multiple AF balls 371 may be a ball bearing.

In an embodiment, the first FPCB 361 may surround an outer periphery of the first camera housing 316.

In an embodiment, the first shield can 312 may cover the first camera housing 316 coupled to the first FPCB 361.

In an embodiment, the first FPCB 361 may include the first IS coil 331, the second IS coil 332, a first magnet detection sensor 3331, and the second magnet detection sensor 3332 arranged on a fourth lateral surface S11 corresponding to an area in which the first IS magnet 321 is arranged.

In an embodiment, the first FPCB 361 may include the third IS coil 341, the fourth IS coil 342, the third magnet detection sensor 3441, and the fourth magnet detection sensor 3442 arranged on a fifth lateral surface S22 corresponding to an area in which the second IS magnet 322 is arranged.

In an embodiment, the first FPCB 361 may include the first AF coil 331 and the fifth magnet detection sensor 3551 arranged on a sixth lateral surface S33 corresponding to an area in which the first AF magnet 323 is arranged.

In an embodiment, the electronic device 101 may include at least one driving integrated circuit (IC). At least one driving IC may be included in the first camera actuator 300. For example, at least one driving IC may be arranged on the first FPCB 361.

In an embodiment, at least one driving IC may be included in the first magnet detection sensor 3331, the second magnet detection sensor 3332, the third magnet detection sensor 3441, the fourth magnet detection sensor 3442, or the fifth magnet detection sensor 3551.

However, embodiments of the disclosure are not limited thereto, and at least one driving IC may be arranged outside the first camera actuator 300. At least one driving IC may be arranged outside the first magnet detection sensor 3331, the second magnet detection sensor 3332, the third magnet detection sensor 3441, the fourth magnet detection sensor 3442, or the fifth magnet detection sensor 3551.

In an embodiment, a driving IC may control a current passing through a coil (e.g., the first IS coil 331, the second IS coil 332, the third IS coil 341, the fourth IS coil 342, or the first AF coil 351). In an embodiment, the first magnet detection sensor 3331 may be arranged between the first IS coil 331 and the second IS coil 332. The first magnet detection sensor 3331 may be arranged in a neutral zone of the first IS magnet 321. The neutral area may be a boundary area between the two poles of the magnet.

In an embodiment, the first magnet detection sensor 3331 may detect a location of the first IS magnet 321. For example, the first magnet detection sensor 3331 may detect a location of the first IS magnet 321 with respect to the y-axis direction.

For example, in a case that the first IS magnet 321 corresponds to a magnet having two poles (e.g., S pole-N pole) magnetized on one surface of the magnet, the first magnet detection sensor 3331 may be arranged in an area facing the neutral area of the first IS magnet 321.

For example, in a case that the first IS magnet 321 corresponds to a magnet having three poles (e.g., N pole-S pole-N pole) magnetized on one surface of the magnet, the first magnet detection sensor 3331 may be arranged in an area facing the neutral area of the first IS magnet 321.

For example, at least one driving IC included in the first magnet detection sensor 3331 may control a current passing through the first IS coil 331 and change an electromagnetic force of the first IS coil 331 so as to control the first IS carrier 314 to move along the y-axis direction.

In an embodiment, at least one driving IC arranged outside the first camera actuator 300 may control a current passing through the first IS coil 331 and change an electromagnetic force of the first IS coil 331 so as to control the first IS carrier 314 to move along the y-axis direction.

In an embodiment, the second magnet detection sensor 3332 may be arranged on a hole or a center of the second IS coil 332. The second magnet detection sensor 3332 may detect a distance between the second IS coil 332 and the first IS magnet 321.

For example, at least one driving IC included in the second magnet detection sensor 3332 may control a current passing through the second IS coil 332 and change an electromagnetic force of the second IS coil 332 so as to control the first IS carrier 314 to move along the x-axis direction.

In an embodiment, at least one driving IC arranged outside the first camera actuator 300 may control a current passing through the second IS coil 332 and change an electromagnetic force of the second IS coil 332 so as to control the first IS carrier 314 to move along the x-axis direction.

In an embodiment, the third magnet detection sensor 3441 may be arranged between the third IS coil 341 and the fourth IS coil 342. The third magnet detection sensor 3441 may be arranged in a neutral zone of the second IS magnet 322.

In an embodiment, the third magnet detection sensor 3441 may detect a location of the second IS magnet 322. For example, the third magnet detection sensor 3441 may detect a location of the second IS magnet 322 with respect to the y-axis direction.

For example, in a case that the second IS magnet 322 corresponds to a magnet having two poles (e.g., S pole-N pole) magnetized on one surface of the magnet, the third magnet detection sensor 3441 may be arranged in an area facing the neutral area of the second IS magnet 322.

For example, in a case that the second IS magnet 322 corresponds to a magnet having three poles (e.g., N pole-S pole-N pole) magnetized on one surface of the magnet, the third magnet detection sensor 3441 may be arranged in an area facing the neutral area of the second IS magnet 322.

For example, at least one driving IC included in the third magnet detection sensor 3441 may control a current passing through the third IS coil 341 and change an electromagnetic force of the third IS coil 341 so as to control the first IS carrier 314 to move along the y-axis direction.

In an embodiment, at least one driving IC arranged outside the first camera actuator 300 may control a current passing through the third IS coil 341 and change an electromagnetic force of the third IS coil 341 so as to control the first IS carrier 314 to move along the y-axis direction.

In an embodiment, the fourth magnet detection sensor 3442 may be arranged on a hole or a center of the fourth IS coil 342. The fourth magnet detection sensor 3442 may detect a distance between the fourth IS coil 342 and the second IS magnet 322.

For example, at least one driving IC included in the fourth magnet detection sensor 3442 may control a current passing through the fourth IS coil 342 and change an electromagnetic force of the fourth IS coil 342 so as to control the first IS carrier 314 to move along the x-axis direction.

In an embodiment, at least one driving IC arranged outside the first camera actuator 300 may control a current passing through the fourth IS coil 342 and change an electromagnetic force of the fourth IS coil 342 so as to control the first IS carrier 314 to move along the x-axis direction.

In an embodiment, the first IS coil 331 and the third IS coil 341 may be controlled by different driving ICs, respectively, to control a current passing through the coils so as to control the first IS carrier 314 to move in the same direction or different directions. In a case that the first IS coil 331 and the third IS coil 341 are controlled by different driving ICs, respectively, to move the first IS carrier 314 in the same direction, the first IS carrier 314 may perform a linear movement along the y-axis. In a case that the first IS coil 331 and the third IS coil 341 are controlled by different driving ICs, respectively, to move the first IS carrier 314 in one of different directions, the first IS carrier 314 may perform a rotation movement.

In an embodiment, in order to control the rotation movement and/or the linear movement of the first IS carrier 314, the first camera actuator 300 may further include Hall sensors in or adjacent to each of the first IS coil 331 and the third IS coil 341. For example, when a distance between Hall sensors is L1 and a difference between movement distances detected by two Hall sensors is L2, a rotation angle of the first IS carrier 314 may be arctan (L2/L1). Arctan refers to an inverse tangent function.

In an embodiment, the second IS coil 332 and the fourth IS coil 342 may be controlled by different driving ICs, respectively, to control a current passing through the coils so as to control the first IS carrier 314 to move in the same direction (e.g., the x axis). In a case that the second IS coil 332 and the fourth IS coil 342 are controlled by different driving ICs, respectively, to move the first IS carrier 314 in the same direction, the first IS carrier 314 may perform a linear movement along the x-axis. In a case that the second IS coil 332 and the fourth IS coil 342 are controlled by different driving ICs, respectively, to move the first IS carrier 314 in different directions, the first IS carrier 314 may perform a rotation movement.

In an embodiment, in order to control the rotation movement and/or the linear movement of the first IS carrier 314, the first camera actuator 300 may further include Hall sensors in or adjacent to each of the second IS coil 332 and the fourth IS coil 342. For example, when a vertical distance between Hall sensors is L1 and a difference between movement distances detected by two Hall sensors is L2, a rotation angle of the first IS carrier 314 may be arctan (L2/L1).

In an embodiment, the first IS coil 331 and the third IS coil 341 may be controlled by the same driving IC (e.g., a first driving IC) to control a current passing through the coils so as to control the first IS carrier 314 to move in the same direction or different directions. In a case that the first IS coil 331 and the third IS coil 341 are controlled by a driving IC (e.g., the first driving IC) to move the first IS carrier 314 in the same direction, the first IS carrier 314 may perform a linear movement along the y-axis.

In an embodiment, the second IS coil 332 and the fourth IS coil 342 may be controlled by the same driving IC (e.g., a second driving IC) to control a current passing through the coils so as to control the first IS carrier 314 to move in the same direction (e.g., the x axis). In a case that the second IS coil 332 and the fourth IS coil 342 are controlled by a driving IC (e.g., the second driving IC) to move the first IS carrier 314 in the same direction, the first IS carrier 314 may perform a linear movement along the x-axis.

In an embodiment, the fifth magnet detection sensor 3551 may be arranged on a hole or a center of the first AF coil 351. In a case that the first AF magnet 323 corresponds to a magnet having two poles (e.g., S pole-N pole) magnetized on one surface of the magnet, the fifth magnet detection sensor 3551 may be arranged in an area facing the neutral area of the first AF magnet 323.

In an embodiment, the fifth magnet detection sensor 3551 may detect a location of the first AF magnet 323. For example, the fifth magnet detection sensor 3551 may detect a location of the first AF magnet 323 with respect to the z-axis direction.

For example, at least one driving IC included in the fifth magnet detection sensor 3551 may control a current passing through the first AF coil 351 and change an electromagnetic force the first AF coil 351 so as to control the first AF carrier 315 to move along the z-axis direction.

In an embodiment, at least one driving IC arranged outside the first camera actuator 300 may control a current passing through the first AF coil 351 and change an electromagnetic force of the first AF coil 351 so as to control the first AF carrier 315 to move along the z-axis direction.

Figure 5:
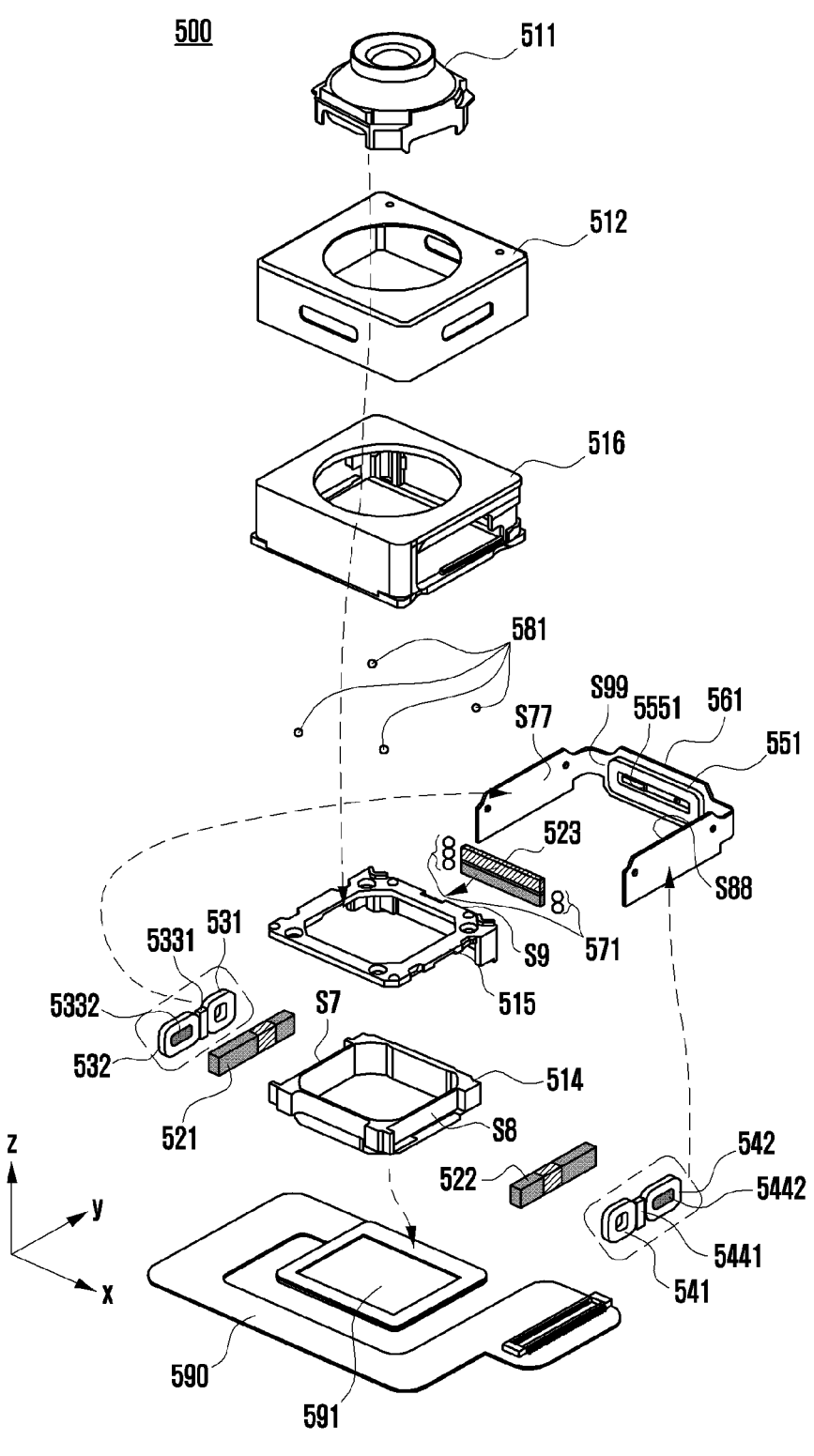
FIG. 5 is an exploded view illustrating a second camera actuator of an electronic device according to an embodiment of the disclosure.

FIG. 5 is an exploded view illustrating a second camera actuator 500 of an electronic device 101 according to an embodiment of the disclosure.

Figure 6:
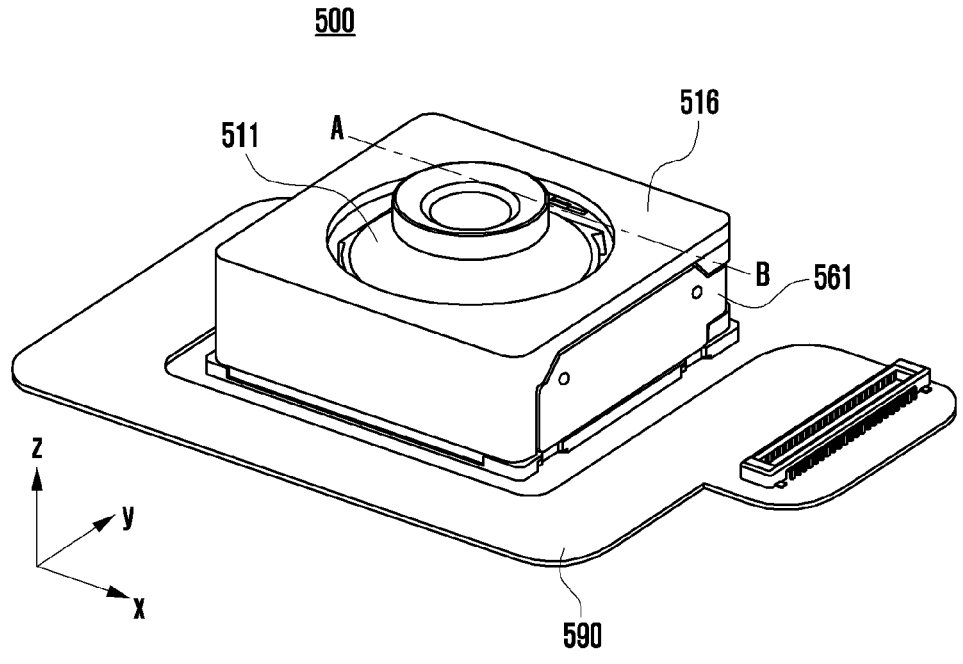
FIG. 6 is a view illustrating a second camera actuator viewed from a first direction, from which a second shield can of an electronic device is removed according to an embodiment of the disclosure.

FIG. 6 is a view illustrating the second camera actuator 500 viewed from a first direction, from which a second shield can 512 of an electronic device 101 is removed according to an embodiment of the disclosure.

Figure 7:
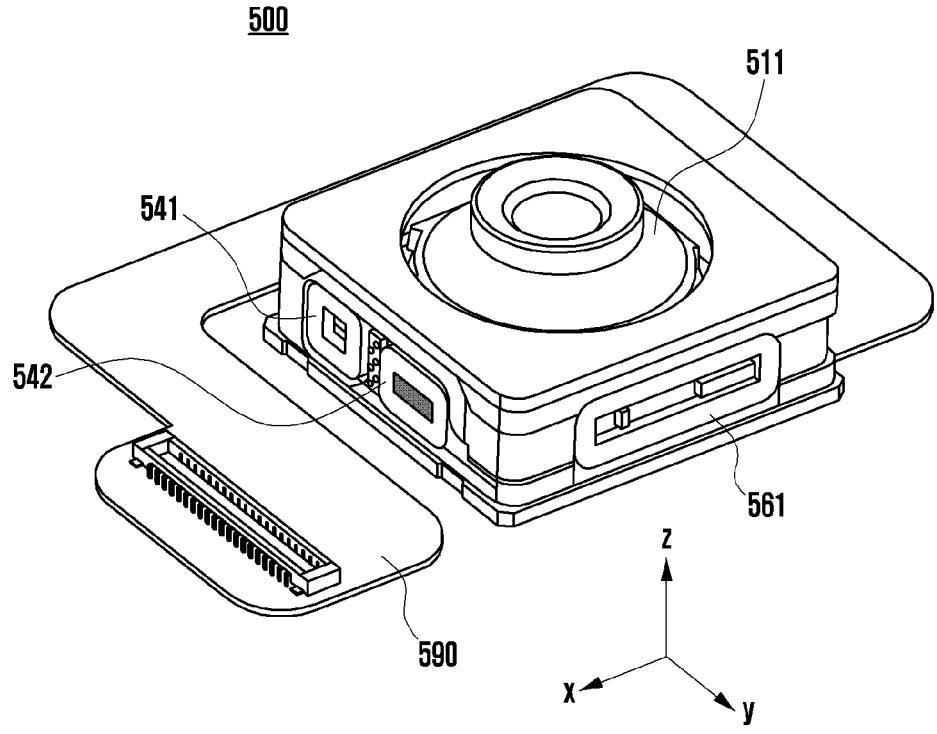
FIG. 7 is a view illustrating a second camera actuator viewed from a second direction, from which a second shield can and a second FPCB of an electronic device are removed according to an embodiment of the disclosure.

FIG. 7 is a view illustrating the second camera actuator 500 viewed from a second direction, from which a second shield can 512 and a second FPCB 561 of an electronic device 101 are removed according to an embodiment of the disclosure.

Figure 8:
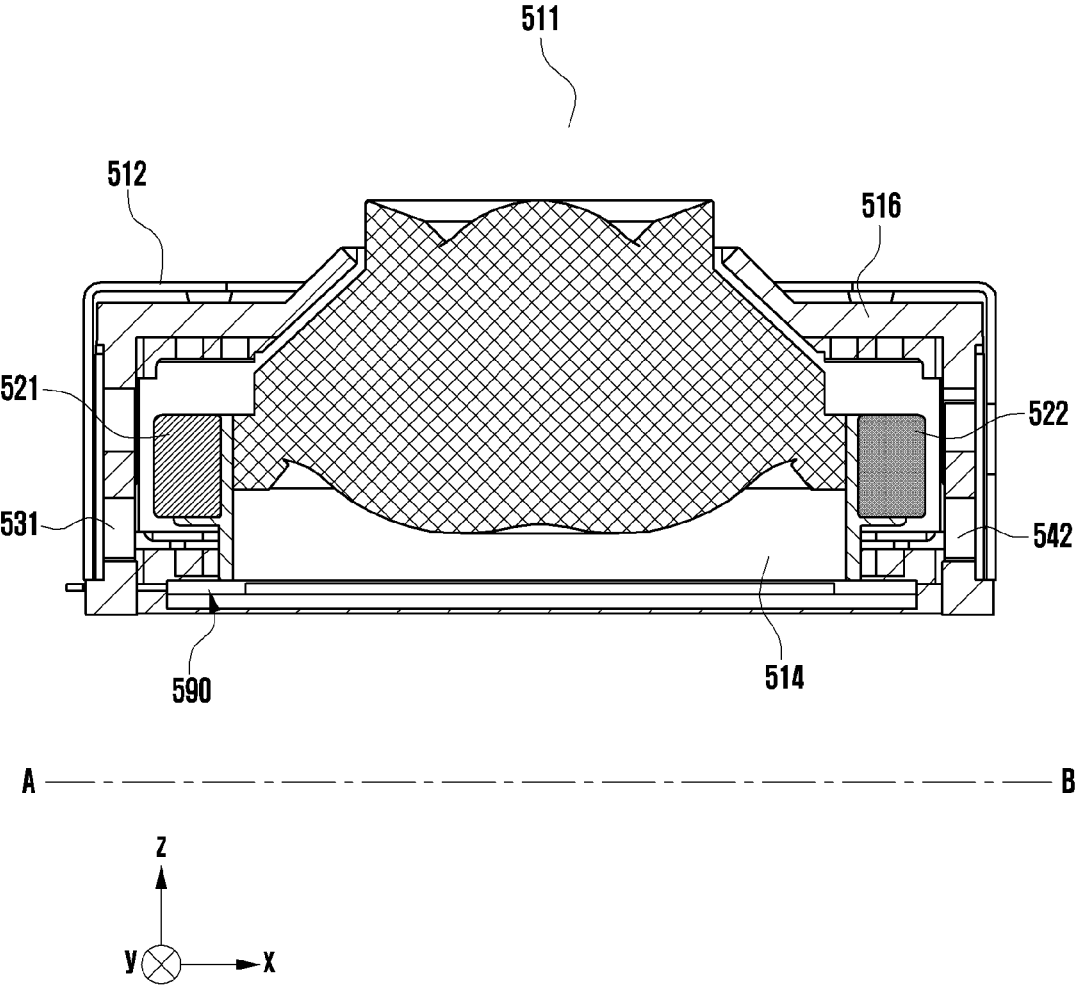
FIG. 8 is a view illustrating a sectional view of a second camera actuator in FIG. 6 taken along an A-B direction.

FIG. 8 is a view illustrating a sectional view of the second camera actuator 500 in FIG. 6 taken along an A-B direction.

Figure 9:
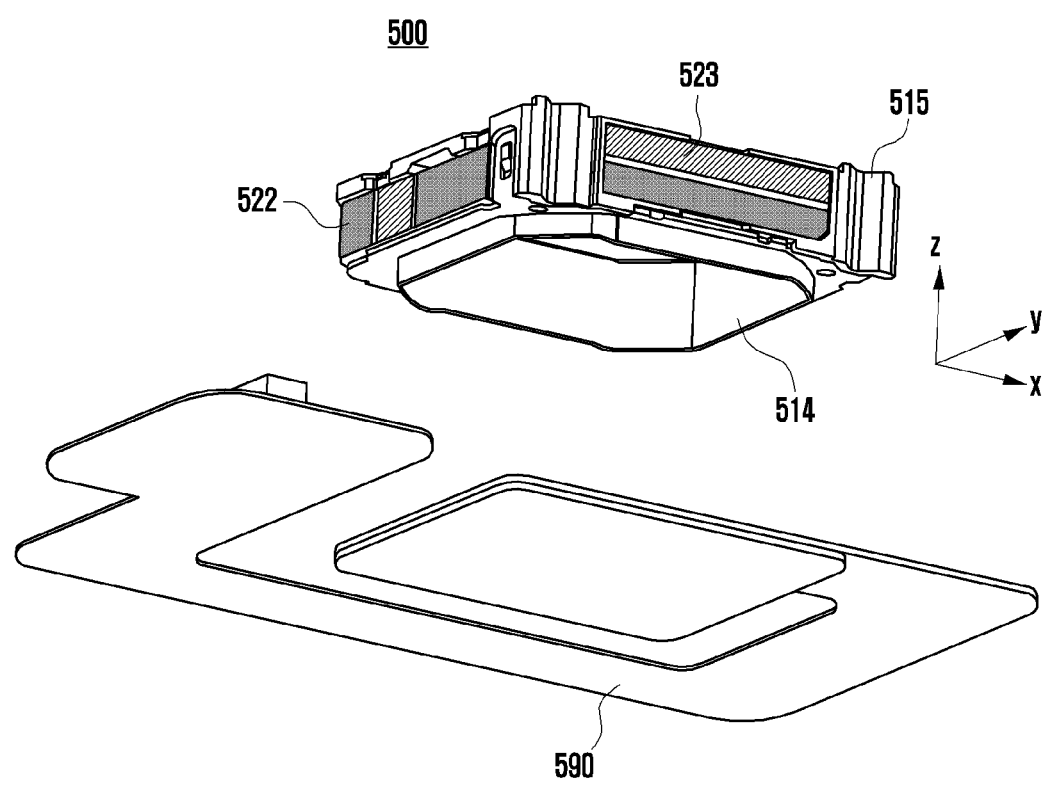
FIG. 9 is a view illustrating an area in which a second IS carrier and a second AF carrier are coupled to a first image sensor of a second camera actuator according to an embodiment of the disclosure.

FIG. 9 is a view illustrating an area in which a second IS carrier 514 and/or a second AF carrier 515 is coupled to a first image sensor 591 of the second camera actuator 500 according to an embodiment of the disclosure.

The first camera actuator 300 of FIG. 3 may move the first IS carrier 314 and the first AF carrier 315 that coupled to the first lens assembly 311 in a manner like shifting a lens and adjust a focus to capture an image or remove (or stabilize) a shaking of an image.

The second camera actuator 500 of FIG. 5 may move the second IS carrier 514 coupled to the first image sensor 591 and/or the second AF carrier 515 coupled to the second lens assembly 511 to adjust a focus to capture an image or remove (or stabilize) a shaking of an image. In some embodiments, the second camera actuator 500 may be included in the camera assembly 180.

Referring to FIGS. 5, 6, 7, 8, and 9, the second camera actuator 500 may include the second lens assembly 511, the second shield can 512, the second IS carrier 514, the second AF carrier 515, a second camera housing 516, a third IS magnet 521, a fourth IS magnet 522, a second AF magnet 523, a fifth IS coil 531, a sixth IS coil 532, a seventh IS coil 541, an eighth IS coil 542, a second AF coil 551, a sixth magnet detection sensor 5331, a seventh magnet detection sensor 5332, an eighth magnet detection sensor 5441, a ninth magnet detection sensor 5442, a tenth magnet detection sensor 5551, a second FPCB 561, second multiple AF balls 571, second multiple IS balls 581, and a first printed circuit board (PCB) 590 including the first image sensor 591.

In an embodiment, the second camera actuator 500 may move, under a control of the processor 120, the second IS carrier 514 coupled to the first image sensor 591 or the second AF carrier 515 coupled to the second lens assembly 511 to maintain a captured image within a designated range, which is deviated from the center of the first image sensor 591.

In an embodiment, the second camera actuator 500 may move, under a control of the processor 120, the second AF carrier 515 to adjust a focus.

In an embodiment, at least a portion of the first PCB 590 may be configured of a flexible circuit for a movement of the first image sensor 591, which is coupled to and which moves together with the second IS carrier 514.

In an embodiment, the second lens assembly 511 may include at least one lens aligned and assembled in the second lens assembly 511. The second lens assembly 511 may correspond to a lens barrel in which at least one lens is assembled.

In an embodiment, the second lens assembly 511 may be coupled to the second AF carrier 515 and moved by an electromagnetic force.

In an embodiment, the second shield can 512 may be located at an outermost edge of the second camera actuator 500 and surround the second IS carrier 514, the second AF carrier 515, and the second camera housing 516.

In an embodiment, the second shield can 512 may block or reduce electromagnetic waves generated externally to reduce occurrence of malfunctions of the second camera actuator 500.

In an embodiment, the second camera housing 516 may be located inside the second shield can 512. The second camera housing 516 may be coupled to or fitted into the second shield can 512.

In an embodiment, the second IS carrier 514 may include the third IS magnet 521 and the fourth IS magnet 522 that are arranged symmetrically around a first axis (e.g., the y axis).

Referring to FIG. 8, the third IS magnet 521 and the fourth IS magnet 522 may be arranged on both lateral surfaces of the second IS carrier 514.

In an embodiment, the second IS carrier 514 may arrange the third IS magnet 521 and the fourth IS magnet 522 on both lateral sides of the second IS carrier 514 to face each other.

In an embodiment, the second IS carrier 514 may include an opening corresponding to the second lens assembly 511.

In an embodiment, the second IS carrier 514 may include the third IS magnet 521 and the fourth IS magnet 522 arranged on both lateral surfaces, respectively, around the first axis (e.g., the y axis).

However, embodiments of the disclosure are not limited thereto, and the second IS carrier 514 may include the third IS magnet 521 and the fourth IS magnet 522 arranged on both lateral surfaces, respectively, around the second axis (e.g., the x axis).

In an embodiment, each of the third IS magnet 521 and the fourth IS magnet 522 may correspond to a magnet having three poles (e.g., N pole-S pole-N pole or S pole-N pole-S pole) magnetized on one surface of the magnet. However, embodiments of the disclosure are not limited thereto, and each of the third IS magnet 521 and the fourth IS magnet 522 may correspond to a magnet having two poles (e.g., S pole-N pole) magnetized on one surface of the magnet.

In an embodiment, the third IS magnet 521 and the fourth IS magnet 522 may be arranged on both sides of the second IS carrier 514, respectively, around the first axis (e.g., the y axis) of the second IS carrier 514.

In an embodiment, the third IS magnet 521 may be arranged on a seventh lateral surface S7 of the second IS carrier 514 and the fourth IS magnet 522 may be arranged on an eighth lateral surface S8 of the second IS carrier 514.

In an embodiment, the seventh lateral surface S7 of the second IS carrier 514 and the eighth lateral surface S8 of the second IS carrier 514 may be substantially parallel to each other.

In an embodiment, the third IS magnet 521 and the fourth IS magnet 522 may be the same magnet. The third IS magnet 521 may be arranged in the same direction as the fourth IS magnet 522.

In an embodiment, the third IS magnet 521 and the fourth IS magnet 522 may be arranged in opposite directions.

In an embodiment, based on the first axis (e.g., the y axis) of the second IS carrier 514, the third IS magnet 521 arranged on the seventh lateral surface S7 of the second IS carrier 514 and the fourth IS magnet 522 arranged on the eighth lateral surface S8 may have the same arrangement direction. The same arrangement direction may indicate that the polarities of the magnets facing each other is the same.

In an embodiment, based on the first axis (e.g., the y axis) of the second IS carrier 514, the third IS magnet 521 arranged on the seventh lateral surface S7 of the second IS carrier 514 and the fourth IS magnet 522 arranged on the eighth lateral surface S8 may have opposite arrangement directions.

In an embodiment, in a case that both the third IS magnet 521 and the fourth IS magnet 522 are magnets having N pole-S pole-N pole, one of two N poles is relatively long and the other of two N poles may have the same length as the S pole.

For example, in a case that long N poles face each other, the third IS magnet 521 and the fourth IS magnet 522 may be arranged in the same direction. For example, in a case that the long N pole and the short N pole face each other, the third IS magnet 521 and the fourth IS magnet 522 may be arranged in opposite directions.

In an embodiment, the second IS carrier 514 may have both lateral surfaces S7 and S8 coupled to the third IS magnet 521 and the fourth IS magnet 522 and at least a portion of the second IS carrier 514 may be coupled to the second AF carrier 515. The second multiple IS balls 581 may be arranged between the second IS carrier 514 and the second camera housing 516. The second AF carrier 515 may include an opening corresponding to the second multiple IS balls 581. The second multiple IS balls 581 may be arranged between the second IS carrier 514 and the second camera housing 516 through the opening corresponding to the second multiple IS balls 581. The second camera housing 516 may further include a ball reception structure corresponding to the second multiple IS balls 581.

In an embodiment, the second multiple IS balls 581 may guide a movement of the second IS carrier 514 when the second IS carrier 514 is moved by an electromagnetic force between a magnet (e.g., the third IS magnet 521 and the fourth IS magnet 522) and a coil (e.g., the fifth IS coil 531, the sixth IS coil 532, the seventh IS coil 541, and the eighth IS coil 542).

In an embodiment, the second multiple IS balls 581 may guide a movement of the second IS carrier 514 in the x-axis direction and the y-axis direction or a rotation movement of the second IS carrier 514 on the x-y plane.

In an embodiment, the second multiple IS balls 581 may include at least three balls and may be arranged on locations corresponding to four corners of the second IS carrier 514, which is substantially square in shape. In an embodiment, each of the second multiple IS balls 581 may be a ball bearing.

In an embodiment, the second IS carrier 514 coupled to the first image sensor 591 may move along the second multiple IS balls 581 arranged between the second camera housing 516 and the second IS carrier 514.

In an embodiment, the second AF carrier 515 may include the second AF magnet 523 arranged on at least a portion of the second AF carrier 515. The second AF carrier 515 may include the second AF magnet 523 arranged on a ninth lateral surface S9. The ninth lateral surface S9 of the second AF carrier 515 may be located in a direction perpendicular to that of the seventh lateral surface S7 of the second IS carrier 514 or that of the eighth lateral surface S8 of the second IS carrier 514.

In an embodiment, the second AF magnet 523 may correspond to a magnet having two poles (e.g., S pole-N pole) magnetized on one surface of the magnet. The third IS magnet 521, the fourth IS magnet 522, and the second AF magnet 523 may have a shape of a bar magnet. The third IS magnet 521 and the fourth IS magnet 522 have magnet poles arranged in the y-axis direction and the second AF magnet 523 may have magnet poles arranged in the z-axis direction.

In an embodiment, the second AF carrier 515 may include at least a portion coupled to the second camera housing 516. The second multiple AF balls 571 may be arranged between the second AF carrier 515 and the second camera housing 516.

In an embodiment, the second multiple AF balls 571 may guide a movement of the second AF carrier 515 when the second AF carrier 515 is moved by an electromagnetic force between a magnet (e.g., the second AF magnet 523) and a coil (e.g., the second AF coil 551).

In an embodiment, the second multiple AF balls 571 may be respectively arranged on both lateral surfaces of the second AF magnet 523 around the second AF magnet 523.

In an embodiment, the second multiple AF balls 571 may guide a movement of the second AF carrier 515 in the z-axis direction. In an embodiment, each of the second multiple AF balls 571 may be a ball bearing.

In an embodiment, the second FPCB 561 may surround an outer periphery of the second camera housing 516.

In an embodiment, the second shield can 512 may cover the second camera housing 516 coupled to the second FPCB 561.

In an embodiment, the second FPCB 561 may include the fifth IS coil 531, the sixth IS coil 532, a sixth magnet detection sensor 5331, and a seventh magnet detection sensor 5332 arranged on a tenth lateral surface S77 corresponding to an area in which the third IS magnet 521 is arranged.

In an embodiment, the second FPCB 561 may include the seventh IS coil 541, the eighth IS coil 542, the eighth magnet detection sensor 5441, and the ninth magnet detection sensor 5442 arranged on an 11th lateral surface S88 corresponding to an area in which the fourth IS magnet 522 is arranged.

In an embodiment, the second FPCB 561 may include the second AF coil 551 and the tenth magnet detection sensor 5551 arranged on a 12th lateral surface S99 corresponding to an area in which the second AF magnet 523 is arranged.

In an embodiment, the electronic device 101 may include at least one driving integrated circuit (IC). At least one driving IC may be included in the second camera actuator 500. For example, at least one driving IC may be arranged on the second FPCB 561.

In an embodiment, at least one driving IC may be included in the sixth magnet detection sensor 5331, the seventh magnet detection sensor 5332, the eighth magnet detection sensor 5441, the ninth magnet detection sensor 5442, and/or the tenth magnet detection sensor 5551.

However, embodiments of the disclosure are not limited thereto, and at least one driving IC may be arranged outside the second camera actuator 500. At least one driving IC may be arranged outside the sixth magnet detection sensor 5331, the seventh magnet detection sensor 5332, the eighth magnet detection sensor 5441, the ninth magnet detection sensor 5442, and/or the tenth magnet detection sensor 5551.

In an embodiment, a driving IC may control a current passing through a coil (e.g., the coil (e.g., the fifth IS coil 531, the sixth IS coil 532, the seventh IS coil 541, the eighth IS coil 542, and/or the second AF coil 551)).

In an embodiment, the sixth magnet detection sensor 5331 may be arranged between the fifth IS coil 531 and the sixth IS coil 532. The sixth magnet detection sensor 5331 may be arranged in a neutral zone of the third IS magnet 521.

In an embodiment, the sixth magnet detection sensor 5331 may detect a location of the third IS magnet 521. For example, the sixth magnet detection sensor 5331 may detect a location of the third IS magnet 521 with respect to the y-axis direction.

For example, in a case that the third IS magnet 521 corresponds to a magnet having two poles (e.g., S pole-N pole) magnetized on one surface of the magnet, the sixth magnet detection sensor 5331 may be arranged in an area facing the neutral area of the third IS magnet 521.

For example, in a case that the third IS magnet 521 corresponds to a magnet having three poles (e.g., N pole-S pole-N pole) magnetized on one surface of the magnet, the sixth magnet detection sensor 5331 may be arranged in an area facing the neutral area of the third IS magnet 521.

For example, at least one driving IC included in the sixth magnet detection sensor 5331 may control a current passing through the fifth IS coil 531 and change an electromagnetic force of the fifth IS coil 531 so as to control the second IS carrier 514 to move along the y-axis direction.

In an embodiment, at least one driving IC arranged outside the second camera actuator 500 may control a current passing through the fifth IS coil 531 and change an electromagnetic force of the fifth IS coil 531 so as to control the second IS carrier 514 to move along the y-axis direction.

In an embodiment, the seventh magnet detection sensor 5332 may be arranged on a hole or a center of the sixth IS coil 532. The seventh magnet detection sensor 5332 may detect a distance between the sixth IS coil 532 and the third IS magnet 521.

For example, at least one driving IC included in the seventh magnet detection sensor 5332 may control a current passing through the sixth IS coil 532 and change an electromagnetic force of the sixth IS coil 532 so as to control the second IS carrier 514 to move along the x-axis direction.

In an embodiment, at least one driving IC arranged outside the second camera actuator 500 may control a current passing through the sixth IS coil 532 and change an electromagnetic force of the sixth IS coil 532 so as to control the second IS carrier 514 to move along the x-axis direction.

In an embodiment, the eighth magnet detection sensor 5441 may be arranged between the seventh IS coil 541 and the eighth IS coil 542. The eighth magnet detection sensor 5441 may be arranged in a neutral zone of the fourth IS magnet 522.

In an embodiment, the eighth magnet detection sensor 5441 may detect a location of the fourth IS magnet 522. For example, the eighth magnet detection sensor 5441 may detect a location of the fourth IS magnet 522 with respect to the y-axis direction.

For example, in a case that the fourth IS magnet 522 corresponds to a magnet having two poles (e.g., S pole-N pole) magnetized on one surface of the magnet, the eighth magnet detection sensor 5441 may be arranged in an area facing the neutral area of the fourth IS magnet 522.

For example, in a case that the fourth IS magnet 522 corresponds to a magnet having three poles (e.g., N pole-S pole-N pole) magnetized on one surface of the magnet, the eighth magnet detection sensor 5441 may be arranged in an area facing the neutral area of the fourth IS magnet 522.

For example, at least one driving IC included in the eighth magnet detection sensor 5441 may control a current passing through the seventh IS coil 541 and change an electromagnetic force of the seventh IS coil 541 so as to control the second IS carrier 514 to move along the y-axis direction.

In an embodiment, at least one driving IC arranged outside the second camera actuator 500 may control a current passing through the seventh IS coil 541 and change an electromagnetic force of the seventh IS coil 541 so as to control the second IS carrier 514 to move along the y-axis direction.

In an embodiment, the ninth magnet detection sensor 5442 may be arranged on a hole or a center of the eighth IS coil 542. The ninth magnet detection sensor 5442 may detect a distance between the eighth IS coil 542 and the fourth IS magnet 522.

For example, at least one driving IC included in the ninth magnet detection sensor 5442 may control a current passing through the eighth IS coil 542 and change an electromagnetic force of the eighth IS coil 542 so as to control the second IS carrier 514 to move along the x-axis direction.

In an embodiment, at least one driving IC arranged outside the second camera actuator 500 may control a current passing through the eighth IS coil 342 and change an electromagnetic force of the eighth IS coil 542 so as to control the second IS carrier 514 to move along the x-axis direction.

In an embodiment, the fifth IS coil 531 and the seventh IS coil 541 may be controlled by different driving ICs, respectively, to control a current passing through the coils so as to control the second IS carrier 514 to move in the same direction and/or different directions. In a case that the fifth IS coil 531 and the seventh IS coil 541 are controlled by different driving ICs, respectively, to move the second IS carrier 514 in the same direction, the second IS carrier 514 may perform a linear movement along the y-axis. In a case that the fifth IS coil 531 and the seventh IS coil 541 are controlled by different driving ICs, respectively, to move the second IS carrier 514 in different directions, the second IS carrier 514 may perform a rotation movement.

In an embodiment, in order to control the rotation movement and/or the linear movement of the second IS carrier 514, the second camera actuator 500 may further include Hall sensors in or adjacent to each of the fifth IS coil 531 and the seventh IS coil 541. For example, when a vertical distance between Hall sensors is L1 and a difference between movement distances detected by two Hall sensors is L2, a rotation angle of the second IS carrier 514 may be arctan (L2/L1).

In an embodiment, the sixth IS coil 532 and the eighth IS coil 542 may be controlled by different driving ICs, respectively, to control a current passing through the coils so as to control the second IS carrier 514 to move in the same direction (e.g., the x axis). In a case that the sixth IS coil 532 and the eighth IS coil 542 are controlled by different driving ICs, respectively, to move the second IS carrier 514 in the same direction, the second IS carrier 514 may perform a linear movement along the x-axis. In a case that the sixth IS coil 532 and the eighth IS coil 542 are controlled by different driving ICs, respectively, to move the second IS carrier 514 in different directions, the second IS carrier 514 may perform a rotation movement.

In an embodiment, in order to control the rotation movement and/or the linear movement of the second IS carrier 514, the second camera actuator 500 may further include Hall sensors in or adjacent to each of the sixth IS coil 532 and the eighth IS coil 542. For example, when a distance between Hall sensors is L1 and a difference between movement distances detected by two Hall sensors is L2, a rotation angle of the second IS carrier 514 may be arctan (L2/L1).

In an embodiment, the fifth IS coil 531 and the seventh IS coil 541 may be controlled by the same driving IC (e.g., a third driving IC) to control a current passing through the coils so as to control the second IS carrier 514 to move in the same direction and/or different directions. In a case that the fifth IS coil 531 and the seventh IS coil 541 are controlled by a driving IC (e.g., the third driving IC) to move the second IS carrier 514 in the same direction, the second IS carrier 514 may perform a linear movement along the y-axis.

In an embodiment, the sixth IS coil 532 and the eighth IS coil 542 may be controlled by the same driving IC (e.g., a fourth driving IC) to control a current passing through the coils so as to control the second IS carrier 514 to move in the same direction (e.g., the y axis). In a case that the sixth IS coil 532 and the eighth IS coil 542 are controlled by a driving IC (e.g., the fourth driving IC) to move the second IS carrier 514 in the same direction, the second IS carrier 514 may perform a linear movement along the x-axis.

In an embodiment, the tenth magnet detection sensor 5551 may be arranged on a hole or a center of the second AF coil 551. In a case that the second AF magnet 523 corresponds to a magnet having two poles (e.g., S pole-N pole) magnetized on one surface of the magnet, the tenth magnet detection sensor 5551 may be arranged in an area facing the neutral area of the second AF magnet 523.

In an embodiment, the tenth magnet detection sensor 5551 may detect a location of the second AF magnet 523. For example, the tenth magnet detection sensor 5551 may detect a location of the second AF magnet 523 with respect to the z-axis direction.

For example, at least one driving IC included in the tenth magnet detection sensor 5551 may control a current passing through the second AF coil 551 and change an electromagnetic force of the second AF coil 551 so as to control the second AF carrier 515 to move along the z-axis direction.

In an embodiment, at least one driving IC arranged outside the second camera actuator 500 may control a current passing through the second AF coil 551 and change an electromagnetic force of the second AF coil 551 so as to control the second AF carrier 515 to move along the z-axis direction.

Figure 10:
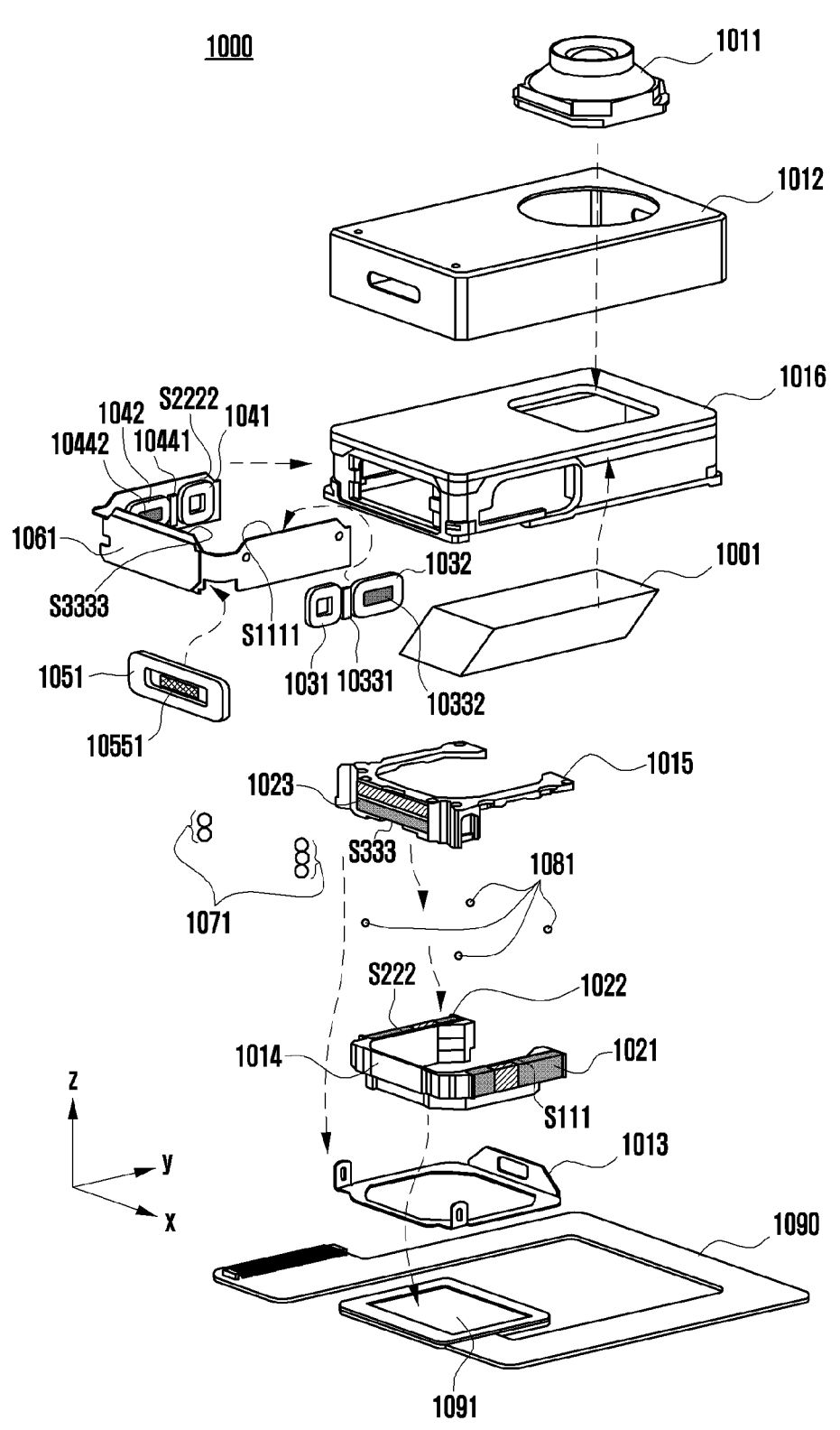
FIG. 10 is an exploded view illustrating a third camera actuator of an electronic device according to an embodiment of the disclosure.

FIG. 10 is an exploded view illustrating a third camera actuator 1000 of an electronic device 101 according to an embodiment of the disclosure.

Figure 11:
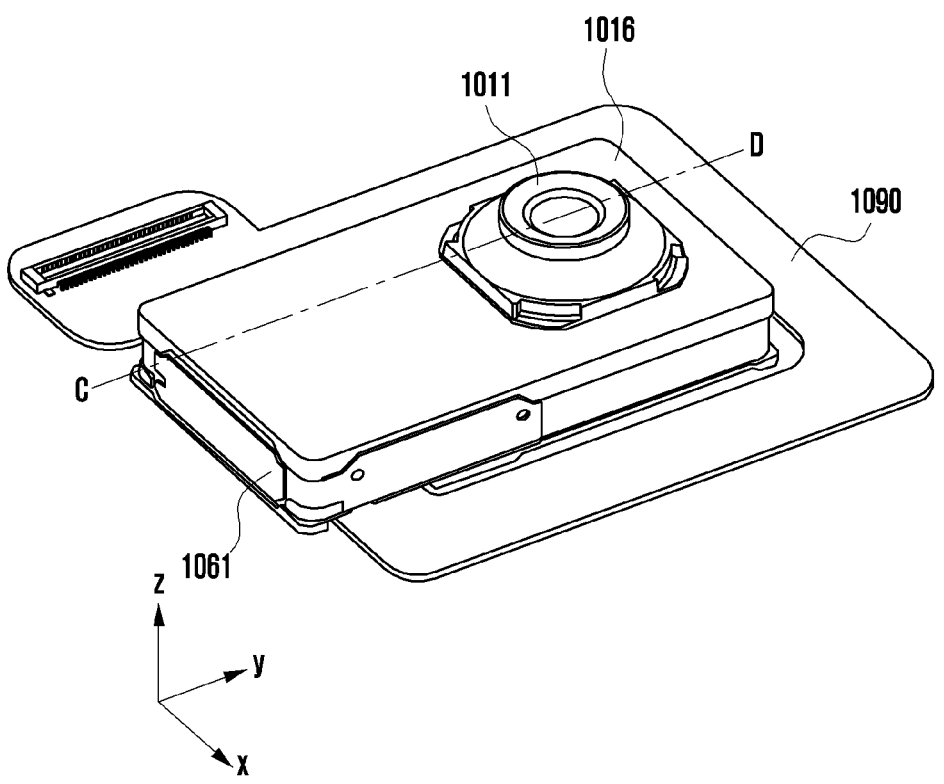
FIG. 11 is a view illustrating a third camera actuator viewed from a lateral direction, from which a third shield can of an electronic device is removed according to an embodiment of the disclosure.

FIG. 11 is a view illustrating a third camera actuator 1000 viewed from a lateral direction, from which a third shield can 1012 of an electronic device 101 is removed according to an embodiment of the disclosure.

Figure 12:
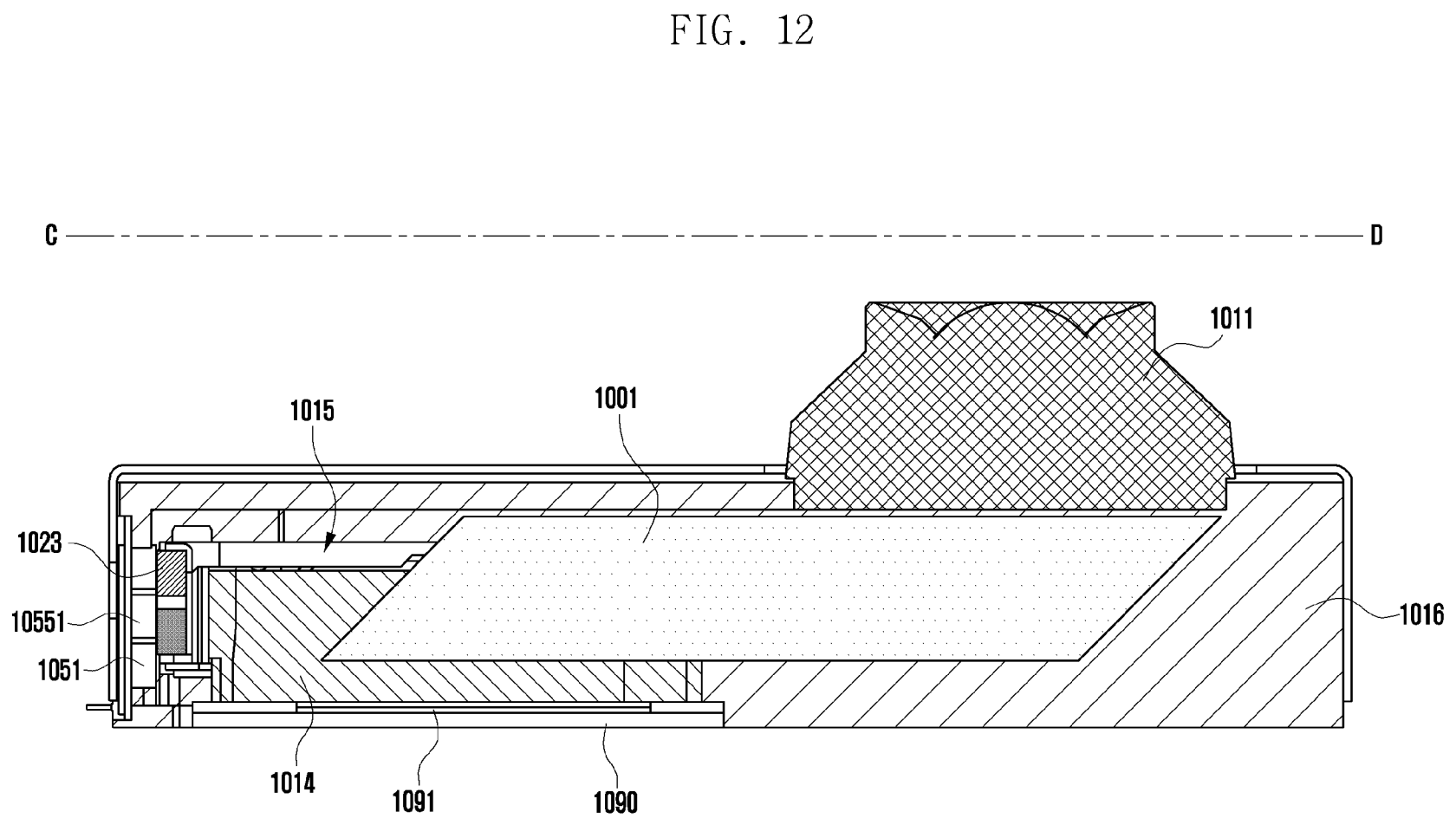

FIG. 12 is a view illustrating a sectional view of a third camera actuator 1000 in FIG. 11 taken along a C-D direction.

Figure 18:
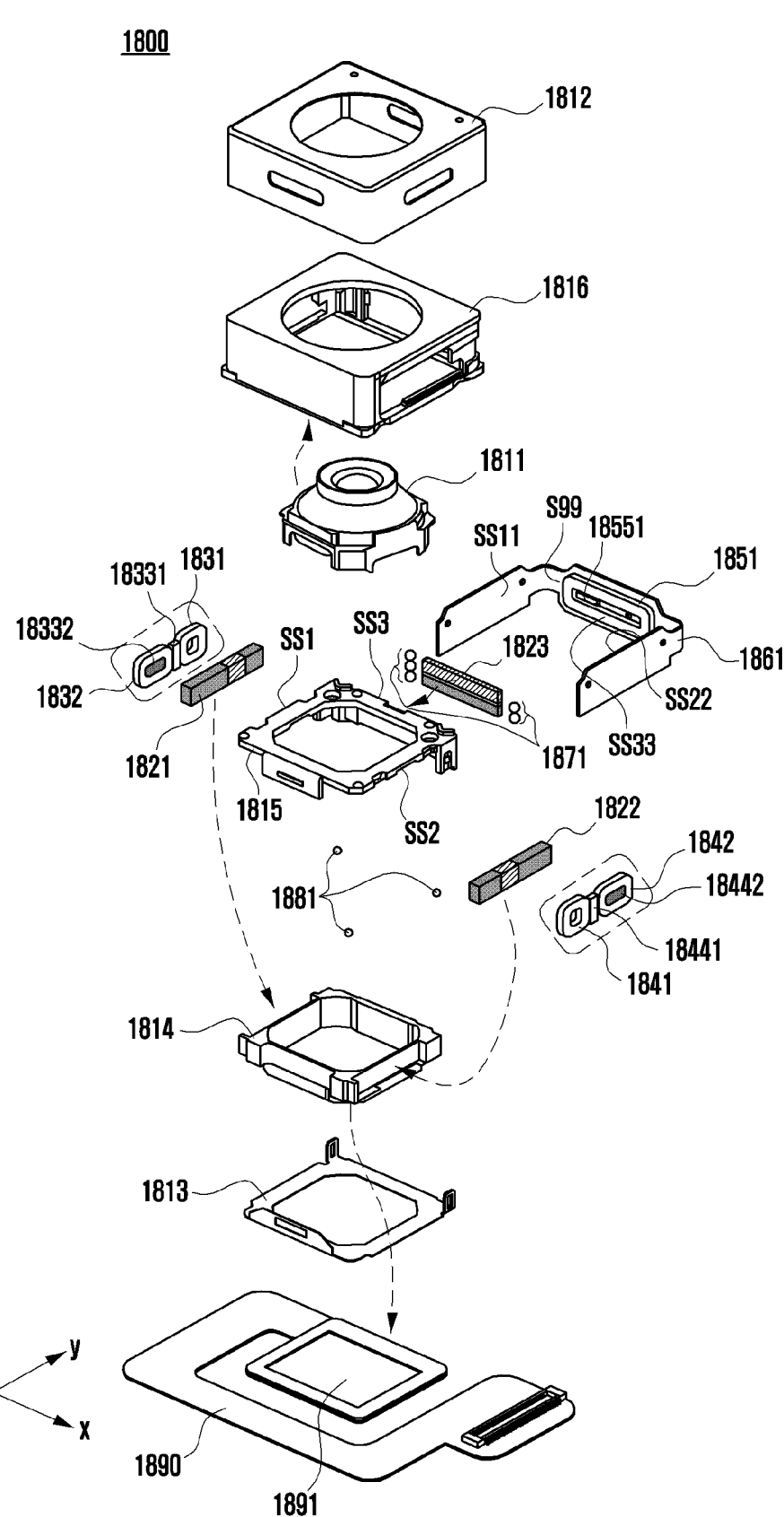
FIG. 18 is an exploded view illustrating a seventh camera actuator of an electronic device according to an embodiment of the disclosure.

The third camera actuator 1000 of FIG. 10 may further include a prism 1001 in addition to a seventh camera actuator 1800 of FIG. 18. The prism 1001 may include a reflection member including at least one reflection surface. The prism 1001 may include a single prism or multiple prisms, and may be located between a third lens assembly 1011 and a second image sensor 1091 to configure an optical path so that light having passed through the third lens assembly 1011 is oriented toward the second image sensor 1091. The prism 1001 may have a trapezoidal shape. The prism 1001 may correspond to a single prism trapezoidal shape. However, embodiments of the disclosure are not limited thereto, and the prism 1001 may be composed of multiple triangular prisms and planar prisms. The third camera actuator 1000 may further include the prism 1001 in addition to the seventh camera actuator 1800 of FIG. 18, thus lowering the overall height of the camera actuator (or the height in the z-axis direction).

The third camera actuator 1000 of FIG. 10 may move the third AF carrier 1015 and/or the third IS carrier 1014 coupled to the second image sensor 1091 to correct focusing and/or shaking.

Referring to FIGS. 10, 11, and 12, the third camera actuator 1000 may include the third lens assembly 1011, a third shield can 1012, a second stopper 1013, a third IS carrier 1014, a third AF carrier 1015, a third camera housing 1016, a fifth IS magnet 1021, a sixth IS magnet 1022, a third AF magnet 1023, a ninth IS coil 1031, a tenth IS coil 1032, an 11th IS coil 1041, a 12th IS coil 1042, a third AF coil 1051, an 11th magnet detection sensor 10331, a 12th magnet detection sensor 10332, a 13th magnet detection sensor 10441, a 14th magnet detection sensor 10442, a 15th magnet detection sensor 10551, a third FPCB 1061, third multiple AF balls 1071, third multiple IS balls 1081, and a second printed circuit board (PCB) 1090 including the second image sensor 1091.

In an embodiment, the third camera actuator 1000 may move, under a control of the processor 120, the third IS carrier 1014 and/or the third AF carrier 1015 coupled to the second image sensor 1091 to ensure that an image is captured when an optical axis of the third lens assembly 1011 and/or the prism 1001 deviates from the center of the second image sensor 1091 is within a specified range.

In an embodiment, the third camera actuator 1000 may move, under a control of the processor 120, the third AF carrier 1015 to adjust a focus.

In an embodiment, at least a portion of the second PCB 1090 may be configured of a flexible circuit for a movement of the second image sensor 1091, which is coupled to and which moves together with the third IS carrier 1014 and/or the third AF carrier 1015.

In an embodiment, the third lens assembly 1011 may include at least one lens aligned and assembled in the third lens assembly 1011. The third lens assembly 1011 may correspond to a lens barrel in which at least one lens is assembled.

In an embodiment, the third lens assembly 1011 and/or the prism 1001 may be fixed to the third camera housing 1016 and has a limitation on movement, and the third IS carrier 1014 and/or the third AF carrier 1015 coupled to the second image sensor 1091 may be moved by an electromagnetic force.

In an embodiment, the prism 1001 may be located between the third lens assembly 1011 and the second image sensor 1091 to configure an optical path so that light having passed through the third lens assembly 1011 is oriented toward the second image sensor 1091.

In an embodiment, the third shield can 1012 may be located at an outermost edge of the third camera actuator 1000 and surround the second stopper 1013, the third IS carrier 1014, the third AF carrier 1015, and the third camera housing 1016.

In an embodiment, the third shield can 1012 may block or reduce electromagnetic waves generated externally to reduce occurrence of malfunctions of the third camera actuator 1000.

In an embodiment, the third camera housing 1016 may be located inside the third shield can 1012. The third camera housing 1016 may be coupled to or fitted into the third shield can 1012.

In an embodiment, the second stopper 1013 may be coupled to or fitted into the third AF carrier 1015. The second stopper 1013 may prevent the third IS carrier 1014 from separating from the third camera housing 1016. In an embodiment, the second stopper 1013 may be omitted.

In an embodiment, the second stopper 1013 may include an opening corresponding to the second image sensor 1091.

In an embodiment, the third IS carrier 1014 may include the fifth IS magnet 1021 and the sixth IS magnet 1022 arranged symmetrically around a first axis (e.g., the y axis). The fifth IS magnet 1021 and the sixth IS magnet 1022 may be arranged on both lateral surfaces of the third IS carrier 1014.

In an embodiment, the third IS carrier 1014 may arrange the fifth IS magnet 1021 and the sixth IS magnet 1022 on both lateral sides of the third IS carrier 1014 to face each other.

In an embodiment, in a case that the prism 1001 is received in the third IS carrier 1014, based on the prism 1001, on both sides of the prism 1001, the fifth IS magnet 1021 and the sixth IS magnet 1022 may be arranged on the lateral surface of the third IS carrier 1014.

In an embodiment, the third IS carrier 1014 may include the fifth IS magnet 1021 and the sixth IS magnet 1022 arranged on both lateral surfaces, respectively, around the first axis (e.g., the y axis).

In an embodiment, the third IS carrier 1014 and the third AF carrier 1015 may include a lateral surface of which at least a portion is opened for receiving the prism 1001.

In an embodiment, each of the fifth IS magnet 1021 and the sixth IS magnet 1022 may correspond to a magnet having three poles (e.g., N pole-S pole-N pole or S pole-N pole-S pole) magnetized on one surface of the magnet. However, embodiments of the disclosure are not limited thereto, and each of the fifth IS magnet 1021 and the sixth IS magnet 1022 may correspond to a magnet having two poles (e.g., S pole-N pole) magnetized on one surface of the magnet.

In an embodiment, the fifth IS magnet 1021 may be arranged on a 13th lateral surface S111 of the third IS carrier 1014, and the sixth IS magnet 1022 may be arranged on an 11th lateral surface S222 of the third IS carrier 1014.

In an embodiment, the 13th lateral surface S111 of the third IS carrier 1014 and the 14th lateral surface S222 of the third IS carrier 1014 may be substantially parallel to each other.

In an embodiment, the fifth IS magnet 1021 and the sixth IS magnet 1022 may be the same magnet. The fifth IS magnet 1021 may be arranged in the same direction as the sixth IS magnet 1022.

In an embodiment, the fifth IS magnet 1021 and the sixth IS magnet 1022 may be arranged in opposite directions.

In an embodiment, based on the first axis (e.g., the y axis) of the third IS carrier 1014, the fifth IS magnet 1021 arranged on the 13th lateral surface S111 of the third IS carrier 1014 and the sixth IS magnet 1022 arranged on the 14th lateral surface S222 may have the same arrangement direction. The same arrangement direction may indicate that the polarity of the magnets facing each other is the same.

In an embodiment, based on the first axis (e.g., the y axis) of the third IS carrier 1014, the fifth IS magnet 1021 arranged on the 13th lateral surface S111 of the third IS carrier 1014 and the sixth IS magnet 1022 arranged on the 14th lateral surface S222 may have opposite arrangement directions.

In an embodiment, in a case that both the fifth IS magnet 1021 and the sixth IS magnet 1022 are a magnet having N pole-S pole-N pole, one of two N poles is long and the other may have the same length as the S pole.

For example, in a case that long N poles face each other, the fifth IS magnet 1021 and the sixth IS magnet 1022 may be arranged in the same direction. For example, in a case that the long N pole and the short N pole face each other, the fifth IS magnet 1021 and the sixth IS magnet 1022 may be arranged in opposite directions.

In an embodiment, the third IS carrier 1014 may have both lateral surfaces S111 and S222 coupled to the fifth IS magnet 1021 and the sixth IS magnet 1022 and at least a portion of the third IS carrier 1014 may be coupled to the third AF carrier 1015. The third IS carrier 1014 may include a lateral surface which is opened to receive the prism 1001. The third multiple IS balls 1081 may be arranged between the third IS carrier 1014 and the third AF carrier 1015.

In an embodiment, the third multiple IS balls 1081 may guide a movement of the third IS carrier 1014 when the third IS carrier 1014 is moved by an electromagnetic force between a magnet (e.g., the fifth IS magnet 1021 and the sixth IS magnet 1022) and a coil (e.g., the ninth IS coil 1031, the tenth IS coil 1032, the 11th IS coil 1041, and the 12th IS coil 1042).

In an embodiment, the third multiple IS balls 1081 may guide a movement of the third IS carrier 1014 in the x-axis direction and the y-axis direction or a rotation movement of the third IS carrier 1014 on the x-y plane.

In an embodiment, the third multiple IS balls 1081 may include at least three balls and may be arranged on locations corresponding to four corners of the third IS carrier 1014, which is substantially square in shape. In an embodiment, each of the third multiple IS balls 1081 may be a ball bearing.

In an embodiment, the third lens assembly 1011 and/or the prism 1001 arranged in the third camera housing 1016 may not move, and the third AF carrier 1015 and/or the third IS carrier 1014 coupled to the second image sensor 1091 may move along the third multiple AF balls 1071 arranged between the third camera housing 1016 and the third AF carrier 1015.

In an embodiment, the third AF carrier 1015 may include the third AF magnet 1023 arranged on at least a portion of the third AF carrier 1015. The third AF carrier 1015 may include the third AF magnet 1023 arranged on a 15th lateral surface S333. The 15th lateral surface S333 of the third AF carrier 1015 may be located in a direction perpendicular to that of the 13th lateral surface S111 of the third IS carrier 1014 and/or the 14th lateral surface S222 of the third IS carrier 1014.

In an embodiment, the third AF magnet 1023 may correspond to a magnet having two poles (e.g., S pole-N pole) magnetized on one surface of the magnet. The fifth IS magnet 1021, the sixth IS magnet 1022, and the third AF magnet 1023 may have a shape of a bar magnet. The fifth IS magnet 1021 and the sixth IS magnet 1022 have magnet poles arranged in the y-axis direction, and the third AF magnet 1023 may have magnet poles arranged in the z-axis direction.

In an embodiment, the third AF carrier 1015 may be coupled to the third camera housing 1016. The third multiple AF balls 1071 may be arranged between the third AF carrier 1015 and the third camera housing 1016.

In an embodiment, the third multiple AF balls 1071 may guide a movement of the third AF carrier 1015 when the third AF carrier 1015 is moved by an electromagnetic force between a magnet (e.g., the third AF magnet 1023) and a coil (e.g., the third AF coil 1051).

In an embodiment, the third multiple AF balls 1071 may be respectively arranged on both lateral surfaces of the third AF magnet 1023 around the third AF magnet 1023.

In an embodiment, the third multiple AF balls 1071 may guide a movement of the third AF carrier 1015 in the z-axis direction. In an embodiment, each of the third multiple AF balls 1071 may be a ball bearing.

In an embodiment, the third FPCB 1061 may surround an outer periphery of the third camera housing 1016.

In an embodiment, the third shield can 1012 may cover the third camera housing 1016 coupled to the third FPCB 1061.

In an embodiment, the third FPCB 1061 may include the ninth IS coil 1031, the tenth IS coil 1032, the 11th magnet detection sensor 10331, and the 12th magnet detection sensor 10332 arranged on a 16th lateral surface S1111 corresponding to an area in which the fifth IS magnet 1021 is arranged.

In an embodiment, the third FPCB 1061 may include the 11th IS coil 1041, the 12th IS coil 1042, the 13th magnet detection sensor 10441, and the 14th magnet detection sensor 10442 arranged on a 17th lateral surface S2222 corresponding to an area in which the sixth IS magnet 1022 is arranged.

In an embodiment, the third FPCB 1061 may include the third AF coil 1051 and the 15th magnet detection sensor 10551 arranged on an 18th lateral surface S3333 corresponding to an area in which the third AF magnet 1023 is arranged.

In an embodiment, the electronic device 101 may include at least one driving integrated circuit (IC). At least one driving IC may be included in the third camera actuator 1000. For example, at least one driving IC may be arranged on the third FPCB 1061.

In an embodiment, at least one driving IC may be included in the 11th magnet detection sensor 10331, the 12th magnet detection sensor 10332, the 13th magnet detection sensor 10441, the 14th magnet detection sensor 10442, and/or the 15th magnet detection sensor 10551.

However, embodiments of the disclosure are not limited thereto, and at least one driving IC may be arranged outside the third camera actuator 1000. At least one driving IC may be arranged outside the 11th magnet detection sensor 10331, the 12th magnet detection sensor 10332, the 13th magnet detection sensor 10441, the 14th magnet detection sensor 10442, and/or the 15th magnet detection sensor 10551.

In an embodiment, a driving IC may control a current passing through a coil (e.g., the coil (e.g., the ninth IS coil 1031, the tenth IS coil 1032, the 11th IS coil 1041, the 12th IS coil 1042, and/or the third AF coil 1051)).

In an embodiment, the 11th magnet detection sensor 10331 may be arranged between the ninth IS coil 1031 and the tenth IS coil 1032. The 11th magnet detection sensor 10331 may be arranged in a neutral zone of the fifth IS magnet 1021.

In an embodiment, the 11th magnet detection sensor 10331 may detect a location of the fifth IS magnet 1021. For example, the 11th magnet detection sensor 10331 may detect a location of the fifth IS magnet 1021 with respect to the y-axis direction.

For example, in a case that the fifth IS magnet 1021 corresponds to a magnet having two poles (e.g., S pole-N pole) magnetized on one surface of the magnet, the 11th magnet detection sensor 10331 may be arranged in an area facing the neutral area of the fifth IS magnet 1021.

For example, in a case that the fifth IS magnet 1021 corresponds to a magnet having three poles (e.g., N pole-S pole-N pole) magnetized on one surface of the magnet, the 11th magnet detection sensor 10331 may be arranged in an area facing the neutral area of the fifth IS magnet 1021.

For example, at least one driving IC included in the 11th magnet detection sensor 10331 may control a current passing through the ninth IS coil 1031 and change an electromagnetic force of the ninth IS coil 1031 so as to control the third IS carrier 1014 to move along the y-axis direction.

In an embodiment, at least one driving IC arranged outside the third camera actuator 1000 may control a current passing through the ninth IS coil 1031 and change an electromagnetic force of the ninth IS coil 1031 so as to control the third IS carrier 1014 to move along the y-axis direction.

In an embodiment, the 12th magnet detection sensor 10332 may be arranged on a hole or a center of the tenth IS coil 1032. The 12th magnet detection sensor 10332 may detect a distance between the tenth IS coil 1032 and the fifth IS magnet 1021.

For example, at least one driving IC included in the 12th magnet detection sensor 10332 may control a current passing through the tenth IS coil 1032 and change an electromagnetic force of the tenth IS coil 1032 so as to control the third IS carrier 1014 to move along the x-axis direction.

In an embodiment, at least one driving IC arranged outside the third camera actuator 1000 may control a current passing through the tenth IS coil 1032 and change an electromagnetic force of the tenth IS coil 1032 so as to control the third IS carrier 1014 to move along the x-axis direction.

In an embodiment, the 13th magnet detection sensor 10441 may be arranged between the 11th IS coil 1041 and the 12th IS coil 1042. The 13th magnet detection sensor 10441 may be arranged in a neutral zone of the sixth IS magnet 1022.

In an embodiment, the 13th magnet detection sensor 10441 may detect a location of the sixth IS magnet 1022. For example, the 13th magnet detection sensor 10441 may detect a location of the sixth IS magnet 1022 with respect to the y-axis direction.

For example, in a case that the sixth IS magnet 1022 corresponds to a magnet having two poles (e.g., S pole-N pole) magnetized on one surface of the magnet, the 13th magnet detection sensor 10441 may be arranged in an area facing the neutral area of the sixth IS magnet 1022.

For example, in a case that the sixth IS magnet 1022 corresponds to a magnet having three poles (e.g., N pole-S pole-N pole) magnetized on one surface of the magnet, the 13th magnet detection sensor 10441 may be arranged in an area facing the neutral area of the sixth IS magnet 1022.

For example, at least one driving IC included in the 13th magnet detection sensor 10441 may control a current passing through the 11th IS coil 1041 and change an electromagnetic force of the 11th IS coil 1041 so as to control the third IS carrier 1014 to move along the y-axis direction.

In an embodiment, at least one driving IC arranged outside the third camera actuator 1000 may control a current passing through the 11th IS coil 1041 and change an electromagnetic force of the 11th IS coil 1041 so as to control the third IS carrier 1014 to move along the y-axis direction.

In an embodiment, the 14th magnet detection sensor 10442 may be arranged on a hole or a center of the 12th IS coil 1042. The 14th magnet detection sensor 10442 may detect a distance between 12th IS coil 1042 and the sixth IS magnet 1022.

For example, at least one driving IC included in the 14th magnet detection sensor 10442 may control a current passing through the 12th IS coil 1042 and change an electromagnetic force of the 12th IS coil 1042 so as to control the third IS carrier 1014 to move along the x-axis direction.

In an embodiment, at least one driving IC arranged outside the third camera actuator 1000 may control a current passing through the 12th IS coil 1042 and change an electromagnetic force of the 12th IS coil 1042 so as to control the third IS carrier 1014 to move along the x-axis direction.

In an embodiment, the ninth IS coil 1031 and the 11th IS coil 1041 may be controlled by different driving ICs, respectively, to control a current passing through the coils so as to control the third IS carrier 1014 to move in the same direction and/or different directions. In a case that the ninth IS coil 1031 and the 11th IS coil 1041 are controlled by different driving ICs, respectively, to move the third IS carrier 1014 in the same direction, the third IS carrier 1014 may perform a linear movement along the y-axis. In a case that the ninth IS coil 1031 and the 11th IS coil 1041 are controlled by different driving ICs, respectively, in different directions, the third IS carrier 1014 may perform a rotation movement.

In an embodiment, in order to control the rotation movement and/or the linear movement of the third IS carrier 1014, the third camera actuator 1000 may further include Hall sensors in or adjacent to each of the ninth IS coil 1031 and the 11th IS coil 1041. For example, when a vertical distance between Hall sensors is L1 and a difference between movement distances detected by two Hall sensors is L2, a rotation angle of the third IS carrier 1014 may be arctan (L2/L1).

In an embodiment, the tenth IS coil 1032 and the 12th IS coil 1042 may be controlled by different driving ICs, respectively, to control a current passing through the coils so as to control the third IS carrier 1014 to move in the same direction (e.g., the x axis). In a case that the tenth IS coil 1032 and the 12th IS coil 1042 are controlled by different driving ICs, respectively, to move the third IS carrier 1014 in the same direction, the third IS carrier 1014 may perform a linear movement along the x-axis. In a case that the tenth IS coil 1032 and the 12th IS coil 1042 are controlled by different driving ICs, respectively, to move the third IS carrier 1014 in different directions, the third IS carrier 1014 may perform a rotation movement.

In an embodiment, in order to control the rotation movement and/or the linear movement of the third IS carrier 1014 when being adjacent thereto, the third camera actuator 1000 may further include Hall sensors in each of the tenth IS coil 1032 and the 12th IS coil 1042. For example, when a vertical distance between Hall sensors is L1 and a difference between movement distances detected by two Hall sensors is L2, a rotation angle of the third IS carrier 1014 may be arctan (L2/L1).

In an embodiment, the ninth IS coil 1031 and the 11th IS coil 1041 may be controlled by the same driving IC (e.g., a fifth driving IC) to control a current passing through the coils so as to control the third IS carrier 1014 to move in the same direction and/or different directions. In a case that the ninth IS coil 1031 and the 11th IS coil 1041 are controlled by a driving ICs (e.g., the fifth driving IC) to move the third IS carrier 1014 in the same direction, the third IS carrier 1014 may perform a linear movement along the y-axis.

In an embodiment, the tenth IS coil 1032 and the 12th IS coil 1042 may be controlled by the same driving IC (e.g., a sixth driving IC) to control a current passing through the coils so as to control the third IS carrier 1014 to move in the same direction (e.g., the y axis). In a case that the tenth IS coil 1032 and the 12th IS coil 1042 are controlled by a driving IC (e.g., the sixth driving IC) to move in the same direction, the third IS carrier 1014 may perform a linear movement along the x-axis.

In an embodiment, the 15th magnet detection sensor 10551 may be arranged on a hole of the third AF coil 1051. In a case that the third AF magnet 1023 corresponds to a magnet having two poles (e.g., S pole-N pole) magnetized on one surface of the magnet, the 15th magnet detection sensor 10551 may be arranged in an area facing the neutral area of the third AF magnet 1023.

In an embodiment, the 15th magnet detection sensor 10551 may detect a location of the third AF magnet 1023. For example, the 15th magnet detection sensor 10551 may detect a location of the third AF magnet 1023 with respect to the z-axis direction.

For example, at least one driving IC included in the 15th magnet detection sensor 10551 may control a current passing through the third AF coil 1051 and change an electromagnetic force of the third AF coil 1051 so as to control the third AF carrier 1015 to move along the z-axis direction.

In an embodiment, at least one driving IC arranged outside the third camera actuator 1000 may control a current passing through the third AF coil 1051 and change an electromagnetic force of the third AF coil 1051 so as to control the third AF carrier 1015 to move along the z-axis direction.

Figure 13:
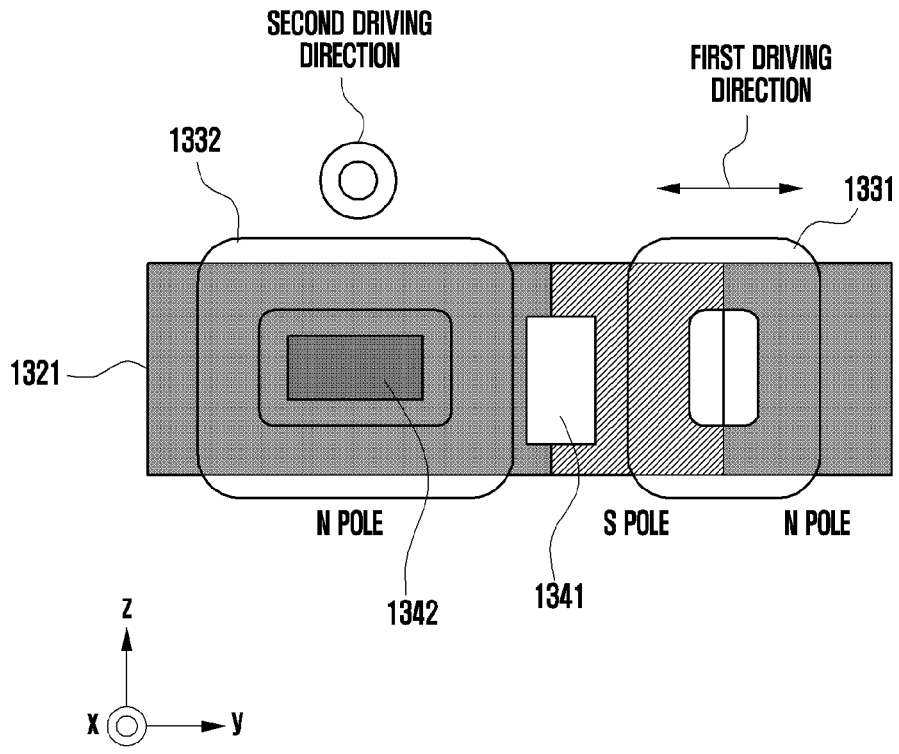
FIG. 13 is a view illustrating an image stabilizer (IS) magnet and coil included in an electronic device according to an embodiment of the disclosure.

FIG. 13 is a view illustrating an image stabilizer (IS) magnet and coil included in an electronic device 101 according to an embodiment of the disclosure.

A seventh IS magnet 1321 in FIG. 13 may correspond to a magnet having three poles (e.g., N pole-S pole-N pole or S pole-N pole-S pole) magnetized on one surface of the magnet.

The seventh IS magnet 1321 may be the same as the first IS magnet 321, the second IS magnet 322, the third IS magnet 521, the fourth IS magnet 522, the fifth IS magnet 1021, and/or the sixth IS magnet 1022.

In an embodiment, a driving IC included in a 16th magnet detection sensor 1341 may control a current passing through a 13th IS coil 1331. The 16th magnet detection sensor 1341 may be arranged between the 13th IS coil 1331 and a 14th IS coil 1332. The 16th magnet detection sensor 1341 may be arranged in a neutral zone of the seventh IS magnet 1321. The 16th magnet detection sensor 1341 may be arranged at a center of the 13th IS coil 1331. In an embodiment, a driving IC arranged outside the 16th magnet detection sensor 1341 may control a current passing through the 13th IS coil 1331.

For example, a driving IC included in the 16th magnet detection sensor 1341 may control a current passing through the 13th IS coil 1331 and change an electromagnetic force of the 13th IS coil 1331 so as to control the seventh IS magnet 1321 to move along a first driving direction (e.g., the y-axis direction). The first driving direction may correspond to a lengthwise direction of the seventh IS magnet 1321.

For example, a driving IC arranged outside the 16th magnet detection sensor 1341 may control a current passing through the 13th IS coil 1331 and change an electromagnetic force of the 13th IS coil 1331 so as to control the seventh IS magnet 1321 to move along the first driving direction (e.g., the y-axis direction).

In an embodiment, a driving IC included in a 17th magnet detection sensor 1342 may control a current passing through the 14th IS coil 1332. The 17th magnet detection sensor 1342 may be arranged on a hole or a center of the 14th IS coil 1332.

In an embodiment, a driving IC arranged outside the 17th magnet detection sensor 1342 may control a current passing through the 14th IS coil 1332.

For example, a driving IC included in the 17th magnet detection sensor 1342 may control a current passing through the 14th IS coil 1332 and change an electromagnetic force of the 14th IS coil 1332 so as to control the seventh IS magnet 1321 to move along a second driving direction (e.g., the x-axis direction).

For example, a driving IC arranged outside the 17th magnet detection sensor 1342 may control a current passing through the 14th IS coil 1332 and change an electromagnetic force of the 14th IS coil 1332 so as to control the seventh IS magnet 1321 to move along a second driving direction (e.g., the x-axis direction).

Figure 14:
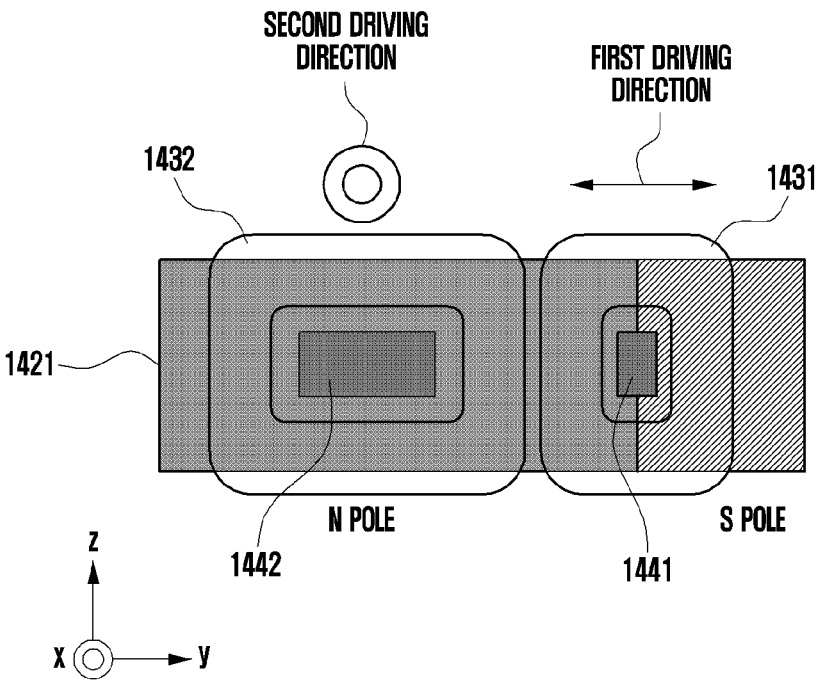
FIG. 14 is a view illustrating an IS magnet and coil included in an electronic device according to an embodiment of the disclosure.

FIG. 14 is a view illustrating an IS magnet and coil included in an electronic device 101 according to an embodiment of the disclosure.

An eighth IS magnet 1421 in FIG. 14 may correspond to a magnet having two poles (e.g., S pole-N pole) magnetized on one surface of the magnet.

The eighth IS magnet 1421 may be the same as the first IS magnet 321, the second IS magnet 322, the third IS magnet 521, the fourth IS magnet 522, the fifth IS magnet 1021, and/or the sixth IS magnet 1022.

In an embodiment, a driving IC included in an 18th magnet detection sensor 1441 may control a current passing through a 15th IS coil 1431. The 18th magnet detection sensor 1441 may be arranged on a hole or a center of the 15th IS coil 1431. The 18th magnet detection sensor 1441 may be arranged in a neutral zone of the eighth IS magnet 1421. The 18th magnet detection sensor 1441 may be arranged at a center of the 15th IS coil 1431. In an embodiment, a driving IC arranged outside the 18th magnet detection sensor 1441 may control a current passing through the 15th IS coil 1431.

For example, the 18th magnet detection sensor 1441 may control a current passing through the 15th IS coil 1431 and change an electromagnetic force of the 15th IS coil 1431 so as to control the eighth IS magnet 1421 to move along the first driving direction (e.g., the eighth IS magnet 1421.

For example, a driving IC arranged outside the 18th magnet detection sensor 1441 may control a current passing through the 15th IS coil 1431 and change an electromagnetic force of the 15th IS coil 1431 so as to control the eighth IS magnet 1421 to move along the first driving direction (e.g., the y-axis direction).

In an embodiment, a driving IC included in a 19th magnet detection sensor 1442 may control a current passing through a 16th IS coil 1432. The 19th magnet detection sensor 1442 may be arranged on a hole or a center of the 16th IS coil 1432.

In an embodiment, a driving IC arranged outside the 19th magnet detection sensor 1442 may control a current passing through the 16th IS coil 1432.

For example, a driving IC included in the 19th magnet detection sensor 1442 may control a current passing through the 16th IS coil 1432 and change an electromagnetic force of the 16th IS coil 1432 so as to control the eighth IS magnet 1421 to move along the second driving direction (e.g., the x-axis direction).

For example, a driving IC arranged outside the 19th magnet detection sensor 1442 may control a current passing through the 16th IS coil 1432 and change an electromagnetic force of the 16th IS coil 1432 so as to control the eighth IS magnet 1421 to move along the second driving direction (e.g., the x-axis direction).

Figure 15:
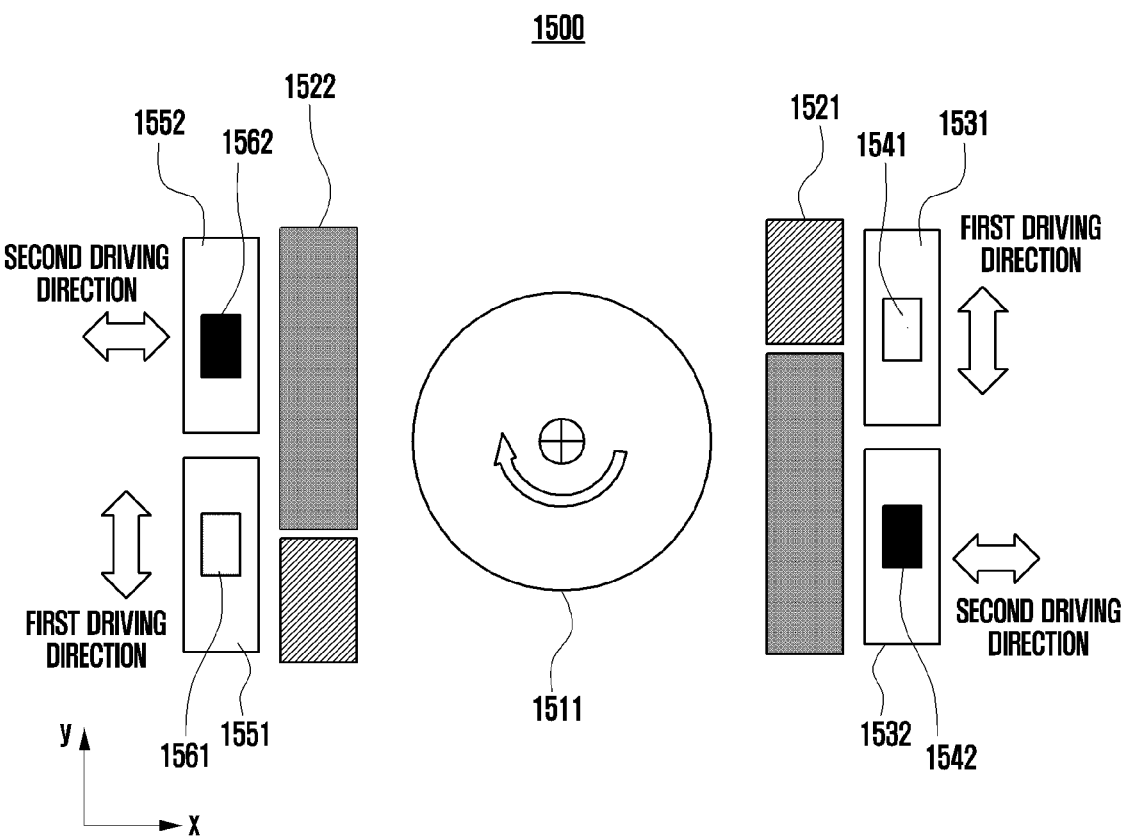
FIG. 15 is a view schematically illustrating a case in which two IS magnets facing parallel to a fourth camera actuator are arranged in opposite directions in an electronic device according to an embodiment of the disclosure.

FIG. 15 is a view schematically illustrating a case in which two IS magnets facing parallel to a fourth camera actuator 1500 are arranged in opposite directions in an electronic device 101 according to an embodiment of the disclosure.

The fourth camera actuator 1500 of FIG. 15 may be the same as the first camera actuator 300, the second camera actuator 500, and/or the third camera actuator 1000.

Each of a ninth IS magnet 1521 and a tenth IS magnet 1522 in FIG. 15 may correspond to a magnet having two poles (e.g., S pole-N pole) magnetized thereon.

In an embodiment, the ninth IS magnet 1521 and the tenth IS magnet 1522 may face each other in parallel and may be arranged on an image stabilizer (IS) carrier in opposite directions.

In an embodiment, arrangement of the ninth IS magnet 1521 and the tenth IS magnet 1522 in opposite directions may indicate a case that the ninth IS magnet 1521 and the tenth IS magnet 1522 face each other and polarities of the magnets are different.

In an embodiment, arrangement of the ninth IS magnet 1521 and the tenth IS magnet 1522 in opposite directions may indicate a case that directions of arranged polarities are different.

The ninth IS magnet 1521 and the tenth IS magnet 1522 may be the same as the first IS magnet 321, the second IS magnet 322, the third IS magnet 521, the fourth IS magnet 522, the fifth IS magnet 1021, the sixth IS magnet 1022, and/or the eighth IS magnet 1421.

In an embodiment, a driving IC included in a 20th magnet detection sensor 1541 may control a current passing through a 17th IS coil 1531.

In an embodiment, a driving IC arranged outside the 20th magnet detection sensor 1541 may control a current passing through the 17th IS coil 1531.

The 20th magnet detection sensor 1541 may be arranged on a hole or a center of the 17th IS coil 1531. The 20th magnet detection sensor 1541 may be arranged in a neutral zone of the ninth IS magnet 1521.

For example, a driving IC included in the 20th magnet detection sensor 1541 or a driving IC arranged outside the 20th magnet detection sensor 1541 may control a current passing through the 17th IS coil 1531 and change an electromagnetic force of the 17th IS coil 1531 so as to control the ninth IS magnet 1521 to move along the first driving direction (e.g., the ninth IS magnet 1521.

In an embodiment, a driving IC included in a 21st magnet detection sensor 1542 may control a current passing through an 18th IS coil 1532.

In an embodiment, a driving IC arranged outside the 21st magnet detection sensor 1542 may control a current passing through the 18th IS coil 1532.

The 21st magnet detection sensor 1542 may be arranged on a hole or a center of the 18th IS coil 1532.

For example, a driving IC included in the 21st magnet detection sensor 1542 or a driving IC arranged outside the 21st magnet detection sensor 1542 may control a current passing through the 18th IS coil 1532 and change an electromagnetic force of the 18th IS coil 1532 so as to control the ninth IS magnet 1521 to move along the second driving direction (e.g., the x-axis direction).

In an embodiment, a driving IC included in a 22nd magnet detection sensor 1561 may control a current passing through a 19th IS coil 1551.

In an embodiment, a driving IC arranged outside the 22nd magnet detection sensor 1561 may control a current passing through the 19th IS coil 1551.

The 22nd magnet detection sensor 1561 may be arranged on a hole or a center of the 19th IS coil 1551. The 22nd magnet detection sensor 1561 may be arranged in a neutral zone of the tenth IS magnet 1522.

For example, a driving IC included in the 22nd magnet detection sensor 1561 or a driving IC arranged outside the 22nd magnet detection sensor 1561 may control a current passing through the 19th IS coil 1551 and change an electromagnetic force of the 19th IS coil 1551 so as to control the tenth IS magnet 1522 to move along the first driving direction (e.g., the tenth IS magnet 1522.

In an embodiment, a driving IC included in a 23rd magnet detection sensor 1562 may control a current passing through a 20th IS coil 1552.

In an embodiment, a driving IC arranged outside the 23rd magnet detection sensor 1562 may control a current passing through the 20th IS coil 1552.

The 23rd magnet detection sensor 1562 may be arranged on a hole or a center of the 20th IS coil 1552. For example, a driving IC included in the 23rd magnet detection sensor 1562 or a driving IC arranged outside the 23rd magnet detection sensor 1562 may control a current passing through the 20th IS coil 1552 and change an electromagnetic force of the 20th IS coil 1552 so as to control the tenth IS magnet 1522 to move along the second driving direction (e.g., the x-axis direction).

In an embodiment, the 17th IS coil 1531 and the 19th IS coil 1551 may be controlled by different driving ICs, respectively, to control a current passing through the coils so as to control an IS carrier to move in the same direction and/or different directions. In a case that the 17th coil 1531 and the 19th IS coil 1551 are controlled by different driving ICs, respectively, to move the IS carrier in the same direction, the IS carrier may perform a linear movement along the y-axis. In a case that the 17th coil 1531 and the 19th IS coil 1551 are controlled by different driving ICs, respectively, in different directions, the IS carrier may perform a rotation movement.

In an embodiment, the 18th IS coil 1532 and the 20th IS coil 1552 may be controlled by different driving ICs, respectively, to control a current passing through the coils so as to control an IS carrier to move in the same direction (e.g., the x axis). In a case that the 18th coil 1532 and the 20th IS coil 1552 are controlled by different driving ICs, respectively, to move the IS carrier in the same direction, the IS carrier may perform a linear movement along the x-axis. In a case that the 18th coil 1532 and the 20th IS coil 1552 are controlled by different driving ICs, respectively, in different directions, the IS carrier may perform a rotation movement.

In an embodiment, the 17th IS coil 1531 and the 19th IS coil 1551 may be controlled by the same driving IC (e.g., a seventh driving IC) to control a current passing through the coils so as to control an IS carrier to move in the same direction and/or different directions. In a case that the 17th coil 1531 and the 19th IS coil 1551 are controlled by a driving IC (e.g., the third driving IC) to move the IS carrier in the same direction, the IS carrier may perform a linear movement along the y-axis.

In an embodiment, the 18th IS coil 1532 and the 20th IS coil 1552 may be controlled by the same driving IC (e.g., an eighth driving IC) to control a current passing through the coils so as to control an IS carrier to move in the same direction (e.g., the x axis). In a case that the 18th coil 1532 and the 20th IS coil 1552 are controlled by a driving IC (e.g., the eighth driving IC) to move in the same direction, the IS carrier may perform a linear movement along the x-axis.

Referring to FIG. 15, depending on a shaking state, an image stabilizer (IS) carrier coupled to the ninth IS magnet 1521 and the tenth IS magnet 1522 may be moved in the x axis and/or the y axis according to a movement of the ninth IS magnet 1521 and the tenth IS magnet 1522 so as to move a lens assembly 1511 or an image sensor. The shaking may be detected by a sensor module (e.g., the sensor module 176 in FIG. 1).

In an embodiment, the image stabilizer (IS) carrier coupled to the ninth IS magnet 1521 and the tenth IS magnet 1522 may be rotated according to a movement of the ninth IS magnet 1521 and the tenth IS magnet 1522 so as to correct shaking of the lens assembly 1511 or the image sensor.

In an embodiment, an optical axis of the fourth camera actuator 1500 and a rotation center of an image stabilizer (IS) carrier coincide, and thus higher correction performance may be secured. Image shaking may be corrected.

Figure 16:
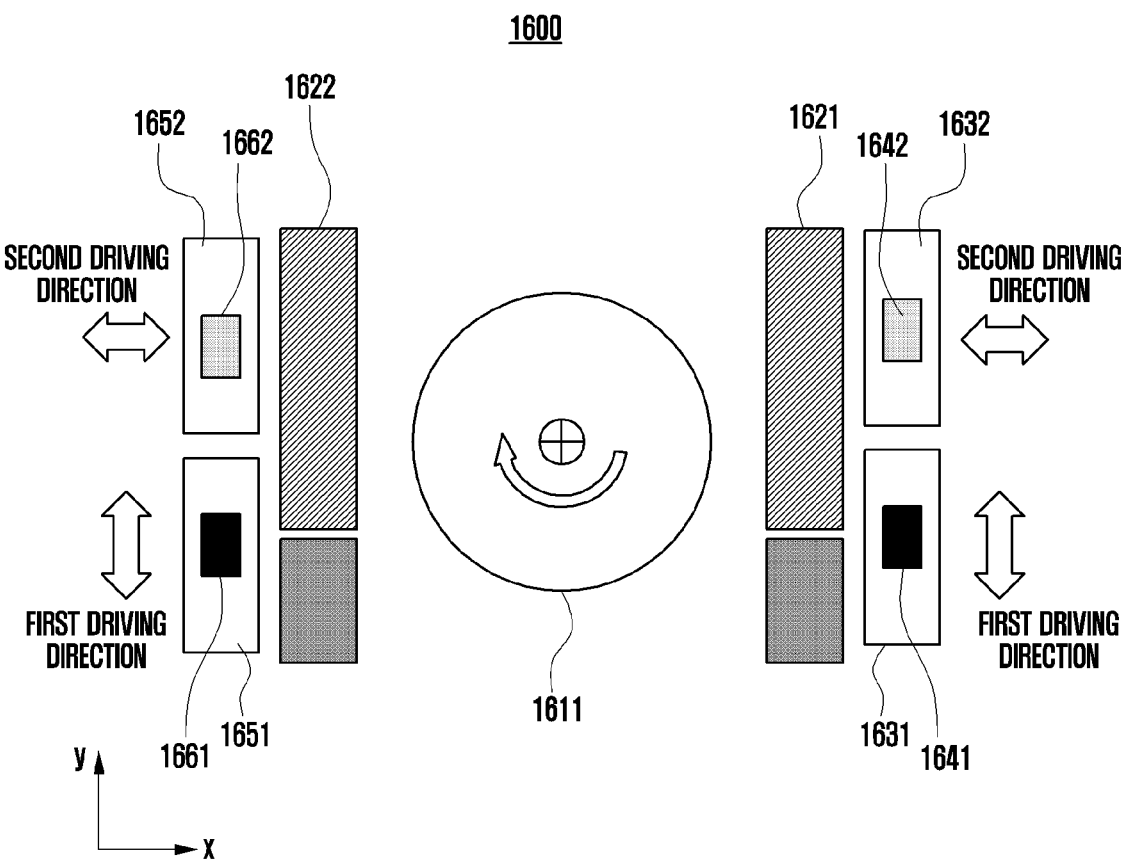
FIG. 16 is a view schematically illustrating a case in which two IS magnets facing parallel to a fifth camera actuator are arranged in the same direction in an electronic device according to an embodiment of the disclosure.

FIG. 16 is a view schematically illustrating a case in which two IS magnets facing parallel to a fifth camera actuator 1600 are arranged in the same direction in an electronic device 101 according to an embodiment of the disclosure.

The fifth camera actuator 1600 of FIG. 16 may be the same as the first camera actuator 300, the second camera actuator 500, and/or the third camera actuator 1000.

Each of an 11th IS magnet 1621 and a 12th IS magnet 1622 in FIG. 16 may correspond to a magnet having two poles (e.g., S pole-N pole) magnetized thereon.

In an embodiment, the 11th IS magnet 1621 and the 12th IS magnet 1622 may face each other in parallel and may be arranged on an image stabilizer (IS) carrier in the same direction.

In an embodiment, arrangement of the 11th IS magnet 1621 and the 12th IS magnet 1622 in the same direction may indicate a case that the 11th IS magnet 1621 and the 12th IS magnet 1622 face each other and polarities of the magnets are the same.

In an embodiment, arrangement of the 11th IS magnet 1621 and the 12th IS magnet 1622 in opposite directions may indicate a case that directions of arranged polarities are the same.

The 11th IS magnet 1621 and the 12th IS magnet 1622 may be the same as the first IS magnet 321, the second IS magnet 322, the third IS magnet 521, the fourth IS magnet 522, the fifth IS magnet 1021, the sixth IS magnet 1022, and/or the eighth IS magnet 1421.

In an embodiment, a driving IC included in the 24th magnet detection sensor 1641 or a driving IC arranged outside the 24th magnet detection sensor 1641 may control a current passing through the 21st IS coil 1631. The 24th magnet detection sensor 1641 may be arranged on a hole or a center of the 21st IS coil 1631. The 24th magnet detection sensor 1641 may be arranged in a neutral zone of the 11th IS magnet 1621.

For example, a driving IC included in the 24th magnet detection sensor 1641 or a driving IC arranged outside the 24th magnet detection sensor 1641 may control a current passing through the 21st IS coil 1631 and change an electromagnetic force of the 21st IS coil 1631 so as to control the 11th IS magnet 1621 to move along the first driving direction (e.g., the y-axis direction). The first driving direction may correspond to a lengthwise direction of the 11th IS magnet 1621.

In an embodiment, a driving IC included in a 25th magnet detection sensor 1642 or a driving IC arranged outside the 25th magnet detection sensor 1642 may control a current passing through a 22nd IS coil 1632. The 25th magnet detection sensor 1642 may be arranged on a hole or a center of the 22nd IS coil 1632. For example, a driving IC included in the 25th magnet detection sensor 1642 or a driving IC arranged outside the 25th magnet detection sensor 1642 may control a current passing through the 22nd IS coil 1632 and change an electromagnetic force of the 22nd IS coil 1632 so as to control the 11th IS magnet 1621 to move along the second driving direction (e.g., the x-axis direction).

In an embodiment, a driving IC included in a 26th magnet detection sensor 1661 or a driving IC arranged outside the 26th magnet detection sensor 1661 may control a current passing through a 23rd IS coil 1651. The 26th magnet detection sensor 1661 may be arranged on a hole or a center of the 23rd IS coil 1651. The 26th magnet detection sensor 1661 may be arranged in a neutral zone of the 12th IS magnet 1622. For example, a driving IC included in the 26th magnet detection sensor 1661 or a driving IC arranged outside the 26th magnet detection sensor 1661 may control a current passing through the 23rd IS coil 1651 and change an electromagnetic force of the 23rd IS coil 1651 so as to control the 12th IS magnet 1622 to move along the first driving direction (e.g., the y-axis direction). The first driving direction may correspond to a lengthwise direction of the 12th IS magnet 1622.

In an embodiment, a driving IC included in a 27th magnet detection sensor 1662 or a driving IC arranged outside the 27th magnet detection sensor 1662 may control a current passing through a 24th IS coil 1652. In an embodiment, a driving IC included in the 27th magnet detection sensor 1662 or a driving IC arranged outside the 27th magnet detection sensor 1662 may be arranged on a hole of the 24th IS coil 1652. For example, the 27th magnet detection sensor 1662 may control a current passing through the 24th IS coil 1652 and change an electromagnetic force of the 24th IS coil 1652 so as to control the 12th IS magnet 1622 to move along the second driving direction (e.g., the x-axis direction).

Referring to FIG. 16, by moving an image stabilizer (IS) carrier coupled to the 11th IS magnet 1621 and the 12th IS magnet 1622 in the x axis and/or the y axis along a movement of the 11th IS magnet 1621 and the 12th IS magnet 1622, shaking may be corrected.

In an embodiment, by rotating the image stabilizer (IS) carrier coupled to the 11th IS magnet 1621 and the 12th IS magnet 1622 along a movement of the 11th IS magnet 1621 and the 12th IS magnet 1622, shaking in a rotation direction may be corrected.

In an embodiment, as optical axis of the fifth camera actuator 1600 and a rotation center of an image stabilizer (IS) carrier coincide, image shaking may be corrected more accurately.

In an embodiment, the 21st IS coil 1631 and the 23rd IS coil 1651 may be controlled by different driving ICs, respectively, to control a current passing through the coils so as to control an IS carrier to move in the same direction and/or different directions. In a case that the 21st coil 1631 and the 23rd IS coil 1651 are controlled by different driving ICs, respectively, to be moved in the same direction, the IS carrier may perform a linear movement along the y-axis. In a case that the 21st coil 1631 and the 23rd IS coil 1651 are controlled by different driving ICs, respectively, in different directions, the IS carrier may perform a rotation movement.

In an embodiment, the 22nd IS coil 1632 and the 24th IS coil 1652 may be controlled by different driving ICs, respectively, to control a current passing through the coils so as to control an IS carrier to move in the same direction (e.g., the x axis). In a case that the 22nd IS coil 1632 and the 24th IS coil 1652 are controlled by different driving ICs, respectively, to be moved in the same direction, the IS carrier may perform a linear movement along the x-axis. In a case that the 22nd IS coil 1632 and the 24th IS coil 1652 are controlled by different driving ICs, respectively, in different directions, the IS carrier may perform a rotation movement. In an embodiment, the 21st IS coil 1631 and the 23rd IS coil 1651 may be controlled by the same driving IC (e.g., a ninth driving IC) to control a current passing through the coils so as to control an IS carrier to move in the same direction and/or different directions. In a case that the 21st coil 1631 and the 23rd IS coil 1651 are controlled by a driving IC (e.g., the ninth driving IC) to move in the same direction, the IS carrier may perform a linear movement along the y-axis.

In an embodiment, the 22nd IS coil 1632 and the 24th IS coil 1652 may be controlled by the same driving IC (e.g., a tenth driving IC) to control a current passing through the coils so as to control an IS carrier to move in the same direction (e.g., the x axis). In a case that the 22nd IS coil 1632 and the 24th IS coil 1652 are controlled by a driving IC (e.g., the tenth driving IC) to move in the same direction, the IS carrier may perform a linear movement along the x-axis.

Figure 17:
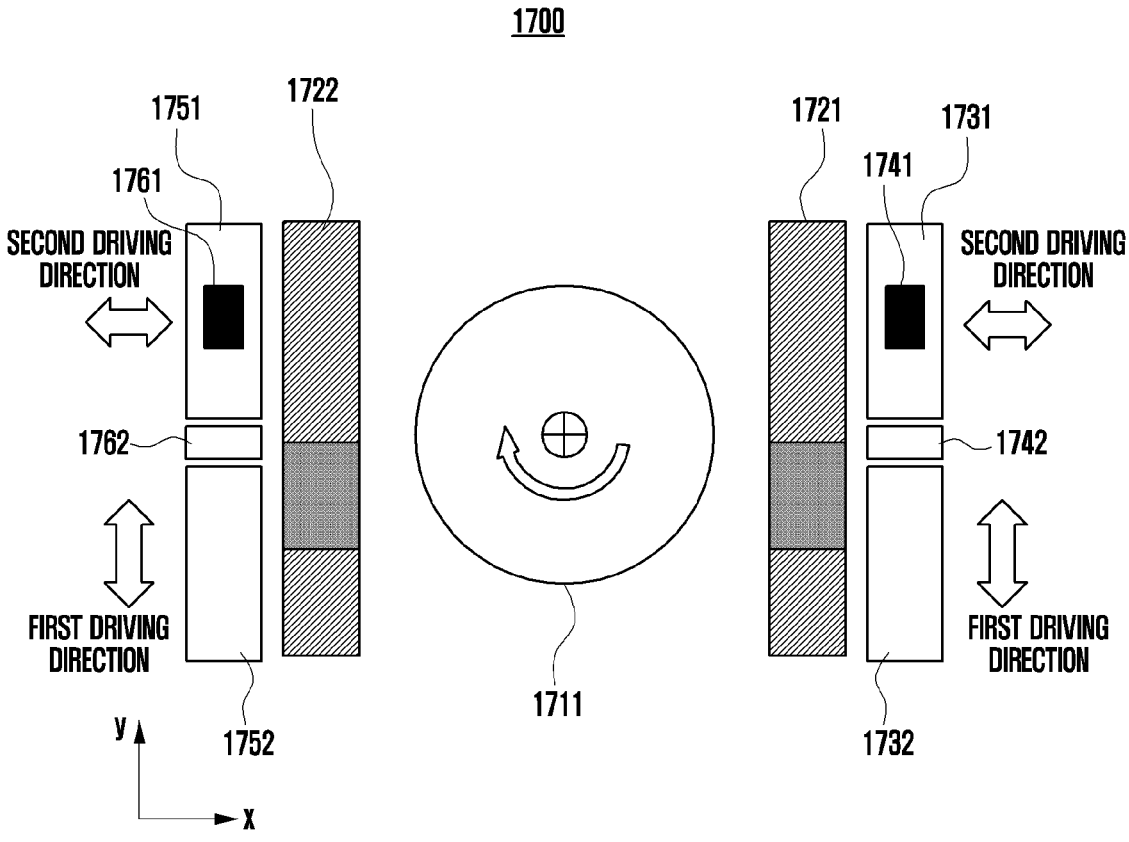
FIG. 17 is a view schematically illustrating a case in which two IS magnets facing parallel to a sixth camera actuator are arranged in the same direction in an electronic device according to an embodiment of the disclosure.

FIG. 17 is a view schematically illustrating a case in which two IS magnets facing parallel to a sixth camera actuator 1700 are arranged in the same direction in an electronic device 101 according to an embodiment of the disclosure.

The sixth camera actuator 1700 of FIG. 17 may be the same as the first camera actuator 300, the second camera actuator 500, and/or the third camera actuator 1000.

Each of a 13th IS magnet 1721 and a 14th IS magnet 1722 in FIG. 17 may correspond to a magnet having three poles (e.g., N pole-S pole-N pole) magnetized thereon.

In an embodiment, the 13th IS magnet 1721 and the 14th IS magnet 1722 may face each other in parallel and may be arranged on an image stabilizer carrier in the same direction.

In an embodiment, arrangement of the 13th IS magnet 1721 and the 14th IS magnet 1722 in the same direction may indicate a case that the 13th IS magnet 1721 and the 14th IS magnet 1722 face each other and polarities of the magnets are the same.

In an embodiment, arrangement of the 13th IS magnet 1721 and the 14th IS magnet 1722 in opposite directions may indicate a case that directions of arranged polarities are the same.

The 13th IS magnet 1721 and the 14th IS magnet 1722 may be the same as the first IS magnet 321, the second IS magnet 322, the third IS magnet 521, the fourth IS magnet 522, the fifth IS magnet 1021, the sixth IS magnet 1022, and/or the seventh IS magnet 1321.

In an embodiment, a driving IC included in a 28th magnet detection sensor 1741 or a driving IC arranged outside the 28th magnet detection sensor 1741 may control a current passing through a 25th IS coil 1731. The 28th magnet detection sensor 1741 may be arranged on a hole or a center of the 25th IS coil 1731.

For example, a driving IC included in the 28th magnet detection sensor 1741 or a driving IC arranged outside the 28th magnet detection sensor 1741 may control a current passing through the 25th IS coil 1731 and change an electromagnetic force the 25th IS coil 1731 so as to control the 13th IS magnet 1721 to move along the second driving direction (e.g., the x-axis direction).

In an embodiment, a driving IC included in a 29th magnet detection sensor 1742 or a driving IC arranged outside the 29th magnet detection sensor 1742 may control a current passing through a 26th IS coil 1732. The 29th magnet detection sensor 1742 may be arranged in a neutral zone of the 13th IS magnet 1721. For example, a driving IC included in the 29th magnet detection sensor 1742 or a driving IC arranged outside the 29th magnet detection sensor 1742 may control a current passing through a 26th IS coil 1732 and change an electromagnetic force of the 26th IS coil 1732 so as to control the 13th IS magnet 1721 to move along the first driving direction (e.g., the y-axis direction). The first driving direction may correspond to a lengthwise direction of the 13th IS magnet 1721.

In an embodiment, a driving IC included in a 30th magnet detection sensor 1761 or a driving IC arranged outside the 30th magnet detection sensor 1761 may control a current passing through a 27th IS coil 1751. A driving IC included in the 30th magnet detection sensor 1761 or a driving IC arranged outside the 30th magnet detection sensor 1761 may be arranged on a hole or a center of the 27th IS coil 1751. The 30th magnet detection sensor 1761 may be arranged in a neutral zone of the 14th IS magnet 1722. For example, a driving IC included in the 30th magnet detection sensor 1761 or a driving IC arranged outside the 30th magnet detection sensor 1761 may control a current passing through the 27th IS coil 1751 and change an electromagnetic force of the 27th IS coil 1751 so as to control the 14th IS magnet 1722 to move along the second driving direction (e.g., the x-axis direction).

In an embodiment, a driving IC included in a 31st magnet detection sensor 1762 or a driving IC arranged outside the 31st magnet detection sensor 1762 may control a current passing through a 28th IS coil 1752. The 31st magnet detection sensor 1762 may be arranged in a neutral zone of the 14th IS magnet 1722. For example, the 31st magnet detection sensor 1762 may control a current passing through the 28th IS coil 1752 and change an electromagnetic force of the 28th IS coil 1752 so as to control the 14th IS magnet 1722 to move along the first driving direction (e.g., the y-axis direction).

Referring to FIG. 17, by moving an image stabilizer (IS) carrier coupled to the 13th IS magnet 1721 and the 14th IS magnet 1722 in the x axis and/or the y axis along a movement of the 13th IS magnet 1721 and the 14th IS magnet 1722, shaking may be corrected.

In an embodiment, it is possible to correct shaking in a rotation direction of the image stabilizer (IS) carrier coupled to the 13th IS magnet 1721 and the 14th IS magnet 1722 along a movement of the 13th IS magnet 1721 and the 14th IS magnet 1722.

In an embodiment, as optical axis of the sixth camera actuator 1700 and a rotation center of an image stabilizer (IS) carrier coincide, image shaking may be corrected more accurately.

In an embodiment, the 25th IS coil 1731 and the 27th IS coil 1751 may be controlled by different driving ICs, respectively, to control a current passing through the coils so as to control an IS carrier to move in the same direction and/or different directions. In a case that the 25th IS coil 1731 and the 27th IS coil 1751 are controlled by different driving ICs, respectively, to be moved in the same direction, the IS carrier may perform a linear movement along the x-axis. In a case that the 25th IS coil 1731 and the 27th IS coil 1751 are controlled by different driving ICs, respectively, in different directions, the IS carrier may perform a rotation movement.

In an embodiment, the 26th IS coil 1732 and the 28th IS coil 1752 may be controlled by different driving ICs, respectively, to control a current passing through the coils so as to control an IS carrier to move in the same direction (e.g., the y axis). In a case that the 26th coil 1732 and the 28th IS coil 1752 are controlled by different driving ICs, respectively, to be moved in the same direction, the IS carrier may perform a linear movement along the y-axis. In a case that the 26th IS coil 1732 and the 28th IS coil 1752 are controlled by different driving ICs, respectively, in different directions, the IS carrier may perform a rotation movement.

In an embodiment, the 25th IS coil 1731 and the 27th IS coil 1751 may be controlled by the same driving IC (e.g., an 11th driving IC) to control a current passing through the coils so as to control an IS carrier to move in the same direction and/or different directions. In a case that the 25th coil 1731 and the 27th IS coil 1751 are controlled by a driving IC (e.g., the 11th driving IC) to move in the same direction, the IS carrier may perform a linear movement along the x-axis.

In an embodiment, the 26th IS coil 1732 and the 28th IS coil 1752 may be controlled by the same driving IC (e.g., a 12th driving IC) to control a current passing through the coils so as to control an IS carrier to move in the same direction (e.g., the y axis). In a case that the 26th coil 1732 and the 28th IS coil 1752 are controlled by a driving IC (e.g., the 12th driving IC) to move in the same direction, the IS carrier may perform a linear movement along the y-axis.

FIG. 18 is an exploded view illustrating a seventh camera actuator 1800 of an electronic device 101 according to an embodiment of the disclosure.

The seventh camera actuator 1800 of FIG. 18 may move a fourth IS carrier 1814 and a fourth AF carrier 1815 coupled to a third image sensor 1891 in a sensor shift manner and correct a focus and shaking.

In the second camera actuator 500 of FIG. 5, the AF carrier may move on the z axis separately from the IS carrier. In the seventh camera actuator 1800 in FIG. 18, an AF carrier may move together with an IS carrier on the z axis.

In an embodiment, the seventh camera actuator 1800 may include a fourth lens assembly 1811, a fourth shield can 1812, a fourth IS carrier 1814, a fourth AF carrier 1815, a fourth camera housing 1816, a 15th IS magnet 1821, a 16th IS magnet 1822, a fourth AF magnet 1823, a 29th IS coil 1831, a 30th IS coil 1832, a 31st IS coil 1841, a 32nd IS coil 1842, a fourth AF coil 1851, a 32nd magnet detection sensor 18331, a 33rd magnet detection sensor 18332, a 34th magnet detection sensor 18441, a 35th magnet detection sensor 18442, a 36th magnet detection sensor 18551, a fourth FPCB 1861, fourth multiple AF balls 1871, fourth multiple IS balls 1881, a third stopper 1813, and a third printed circuit board (PCB) 1890 including the third image sensor 1891.

In an embodiment, the seventh camera actuator 1800 may move, under a control of the processor 120, the fourth IS carrier 1814 and/or the fourth AF carrier 1815 coupled to the third image sensor 1891 to ensure that an image is captured when an optical axis of the fourth lens assembly 1811 deviates from the center of the third image sensor 1891 is within a specified range.

In an embodiment, the seventh camera actuator 1800 may move, under a control of the processor 120, the fourth AF carrier 1815 to adjust a focus.

In an embodiment, at least a portion of the third PCB 1890 may be configured of a flexible circuit for a movement of the third image sensor 1891, which is coupled to and which moves together with the fourth IS carrier 1814 and/or the fourth AF carrier 1815.

In an embodiment, the fourth lens assembly 1811 may include at least one lens aligned and assembled in the fourth lens assembly 1811. The fourth lens assembly 1811 may correspond to a lens barrel in which at least one lens is assembled.

In an embodiment, the fourth lens assembly 1811 may be fixed to the fourth camera housing 1816 and has a limitation on movement, and the fourth IS carrier 1814 and/or the fourth AF carrier 1815 coupled to the third image sensor 1891 may be moved by an electromagnetic force.

In an embodiment, the fourth shield can 1812 may be located at an outermost edge of the seventh camera actuator 1800 and surround the fourth IS carrier 1814, the fourth AF carrier 1815, and the fourth camera housing 1816.

In an embodiment, the fourth shield can 1812 may block or reduce electromagnetic waves generated externally to reduce occurrence of malfunctions of the seventh camera actuator 1800.

In an embodiment, the fourth camera housing 1816 may be located inside the fourth shield can 1812. The fourth camera housing 1816 may be coupled to or fitted into the fourth shield can 1812.

In an embodiment, the third stopper 1813 may be coupled to or fitted into the fourth AF carrier 1815. The third stopper 1813 may prevent the fourth IS carrier 1814 from separating from the fourth camera housing 1816. In an embodiment, the third stopper 1813 may be omitted.

In an embodiment, the third stopper 1813 may include an opening corresponding to the third image sensor 1891.

In an embodiment, the fourth IS carrier 1814 may include the 15th IS magnet 1821 and the 16th IS magnet 1822 arranged symmetrically around a first axis (e.g., the y axis).

In an embodiment, the 15th IS magnet 1821 and the 16th IS magnet 1822 may be arranged on both lateral surfaces of the fourth IS carrier 1814.

In an embodiment, the fourth IS carrier 1814 may arrange the 15th IS magnet 1821 and the 16th IS magnet 1822 on both lateral sides of the fourth IS carrier 1814 to face each other.

In an embodiment, the fourth IS carrier 1814 may include an opening corresponding to the fourth lens assembly 1811.

In an embodiment, the fourth IS carrier 1814 may include the 15th IS magnet 1821 and the 16th IS magnet 1822 arranged on both lateral surfaces, respectively, around the first axis (e.g., the y axis).

However, embodiments of the disclosure are not limited thereto, and the fourth IS carrier 1814 may include the 15th IS magnet 1821 and the 16th IS magnet 1822 arranged on both lateral surfaces, respectively, around the second axis (e.g., the x axis).

In an embodiment, each of the 15th IS magnet 1821 and the 16th IS magnet 1822 may correspond to a magnet having three poles (e.g., N pole-S pole-N pole or S pole-N pole-S pole) magnetized on one surface of the magnet. However, embodiments of the disclosure are not limited thereto, and each of the 15th IS magnet 1821 and the 16th IS magnet 1822 may correspond to a magnet having two poles (e.g., S pole-N pole) magnetized on one surface of the magnet.

In an embodiment, the 15th IS magnet 1821 and the 16th IS magnet 1822 may be arranged on both sides of the fourth IS carrier 1814, respectively, around the first axis (e.g., the y axis) of the fourth IS carrier 1814.

In an embodiment, the 15th IS magnet 1821 may be arranged on a 19th lateral surface SS1 of the fourth IS carrier 1814, and the 16th IS magnet 1822 may be arranged on a 20th lateral surface SS2 of the fourth IS carrier 1814.

In an embodiment, the 19th lateral surface SS1 of the fourth IS carrier 1814 and the 20th lateral surface SS2 of the fourth IS carrier 1814 may be substantially parallel to each other.

In an embodiment, the 15th IS magnet 1821 and the 16th IS magnet 1822 may be the same magnet. The 15th IS magnet 1821 may be arranged in the same direction as the 16th IS magnet 1822.

In an embodiment, the 15th IS magnet 1821 and the 16th IS magnet 1822 may be arranged in opposite directions.

In an embodiment, based on the first axis (e.g., the y axis) of the fourth IS carrier 1814, the 15th IS magnet 1821 arranged on the 19th lateral surface SS1 of the fourth IS carrier 1814 and the 16th IS magnet 1822 arranged on the 20th lateral surface SS2 may have the same arrangement direction. The same arrangement direction may indicate that the polarity of the magnets facing each other is the same.

In an embodiment, based on the first axis (e.g., the y axis) of the fourth IS carrier 1814, the 15th IS magnet 1821 arranged on the 19th lateral surface SS1 of the fourth IS carrier 1814 and the 16th IS magnet 1822 arranged on the 20th lateral surface SS2 may have opposite arrangement directions.

In an embodiment, in a case that both the 15th IS magnet 1821 and the 16th IS magnet 1822 are a magnet having N pole-S pole-N pole, one of two N poles is long and the other may have the same length as the S pole.

For example, in a case that long N poles face each other, it may be considered that the 15th IS magnet 1821 and the 16th IS magnet 1822 are arranged in the same direction. In a case that the long N pole and the short N pole face each other, it may be considered that the 15th IS magnet 1821 and the 16th IS magnet 1822 are arranged in opposite directions.

In an embodiment, the fourth IS carrier 1814 may have both lateral surfaces SS1 and SS2 coupled to the 15th IS magnet 1821 and the 16th IS magnet 1822 and at least a portion the fourth IS carrier 1814 may be coupled to the fourth AF carrier 1815. The fourth multiple IS balls 1881 may be arranged between the fourth IS carrier 1814 and the fourth AF carrier 1815.

In an embodiment, the fourth multiple IS balls 1881 may guide a movement of the fourth IS carrier 1814 when the fourth IS carrier 1814 is moved by an electromagnetic force between a magnet (e.g., the 15th IS magnet 1821 and the 16th IS magnet 1822) and a coil (e.g., the 29th IS coil 1831, the 30th IS coil 1832, the 31st IS coil 1841, and the 32nd IS coil 1842).

In an embodiment, the fourth multiple IS balls 1881 may guide a movement of the fourth IS carrier 1814 in the x-axis direction and the y-axis direction or a rotation movement of the fourth IS carrier 1814 on the x-y plane.

In an embodiment, the fourth multiple IS balls 1881 may include at least three balls and may be arranged on locations corresponding to four corners of the fourth IS carrier 1814, which is substantially square in shape. In an embodiment, each of the fourth multiple IS balls 1881 may be a ball bearing.

In an embodiment, the fourth lens assembly 1811 arranged in the fourth camera housing 1816 may not move, and the fourth AF carrier 1815 and/or the fourth IS carrier 1814 coupled to the third image sensor 1891 may move along the fourth multiple balls 1881 arranged between the fourth AF carrier 1815 and the fourth IS carrier 1814.

In an embodiment, the fourth AF carrier 1815 may include the fourth AF magnet 1823 arranged on at least a portion of the fourth AF carrier 1815. The fourth AF carrier 1815 may include the fourth AF magnet 1823 arranged on a 21st lateral surface SS3. The 21st lateral surface SS3 of the fourth AF carrier 1815 may be located in a direction perpendicular to that of the 19th lateral surface SS1 of the fourth IS carrier 1814 and/or the 20th lateral surface SS2 of the fourth IS carrier 1814.

In an embodiment, the fourth AF magnet 1823 may correspond to a magnet having two poles (e.g., S pole-N pole) magnetized on one surface of the magnet. The 15th IS magnet 1821, the 16th IS magnet 1822, and the fourth AF magnet 1823 may have a shape of a bar magnet. The 15th IS magnet 1821 and the 16th IS magnet 1822 have magnet poles arranged in the y-axis direction, the fourth AF magnet 1823 may have magnet poles arranged in the z-axis direction.

In an embodiment, the fourth AF carrier 1815 may be coupled to the fourth camera housing 1816. The fourth multiple AF balls 1871 may be arranged between the fourth AF carrier 1815 and the fourth camera housing 1816.

In an embodiment, the fourth multiple AF balls 1871 may guide a movement of the fourth AF carrier 1815 when the fourth AF carrier 1815 is moved by an electromagnetic force between a magnet (e.g., the fourth AF magnet 1823) and a coil (e.g., the fourth AF coil 1851).

In an embodiment, the fourth multiple AF balls 1871 may be respectively arranged on both lateral surfaces of the fourth AF magnet 1823 around the fourth AF magnet 1823.

In an embodiment, the fourth multiple AF balls 1871 may guide a movement of the fourth AF carrier 1815 in the z-axis direction. In an embodiment, each of the second multiple AF balls 571 may be a ball bearing.

In an embodiment, the fourth FPCB 1861 may surround an outer periphery of the fourth camera housing 1816.

In an embodiment, the fourth shield can 1812 may cover the fourth camera housing 1816 coupled to the fourth FPCB 1861.

In an embodiment, the fourth FPCB 1861 may include the 29th IS coil 1831, the 30th IS coil 1832, the 32nd magnet detection sensor 18331, and the 33rd magnet detection sensor 18332 arranged on a 22nd lateral surface SS11 corresponding to an area in which the 15th IS magnet 1821 is arranged.

In an embodiment, the fourth FPCB 1861 may include the 31st IS coil 1841, the 32nd IS coil 1842, the 34th magnet detection sensor 18441, and the 35th magnet detection sensor 18442 arranged on a 23rd lateral surface SS22 corresponding to an area in which the 16th IS magnet 1822 is arranged.

In an embodiment, the fourth FPCB 1861 may include the fourth AF coil 1851 and the 36th magnet detection sensor 18551 arranged on a 24th lateral surface SS33 corresponding to an area in which the fourth AF magnet 1823 is arranged.

In an embodiment, the electronic device 101 may include at least one driving integrated circuit (IC). At least one driving IC may be included in the seventh camera actuator 1800. For example, at least one driving IC may be arranged on the fourth FPCB 1861.

In an embodiment, at least one driving IC may be included in the 32nd magnet detection sensor 18331, the 33rd magnet detection sensor 18332, the 34th magnet detection sensor 18441, the 35th magnet detection sensor 18442, and/or the 36th magnet detection sensor 18551.

However, embodiments of the disclosure are not limited thereto, and at least one driving IC may be arranged outside the seventh camera actuator 1800. At least one driving IC may be arranged outside the 32nd magnet detection sensor 18331, the 33rd magnet detection sensor 18332, the 34th magnet detection sensor 18441, the 35th magnet detection sensor 18442, and/or the 36th magnet detection sensor 18551.

In an embodiment, a driving IC may control a current passing through a coil (e.g., the coil (e.g., the 29th IS coil 1831, the 30th IS coil 1832, the 31st IS coil 1841, the 32nd IS coil 1842, and/or the fourth AF coil 1851)).

In an embodiment, the 32nd magnet detection sensor 18331 may be arranged between the 29th IS coil 1831 and the 30th IS coil 1832. The 32nd magnet detection sensor 18331 may be arranged in a neutral zone of the 15th IS magnet 1821.

In an embodiment, the 32nd magnet detection sensor 18331 may detect a location of the 15th IS magnet 1821. For example, the 32nd magnet detection sensor 18331 may detect a location of the 15th IS magnet 1821 with respect to the y-axis direction.

For example, in a case that the 15th IS magnet 1821 corresponds to a magnet having two poles (e.g., S pole-N pole) magnetized on one surface of the magnet, the 32nd magnet detection sensor 18331 may be arranged in an area facing the neutral area of the 15th IS magnet 1821.

For example, in a case that the 15th IS magnet 1821 corresponds to a magnet having three poles (e.g., N pole-S pole-N pole) magnetized on one surface of magnet, the 32nd magnet detection sensor 18331 may be arranged in an area facing the neutral area of the 15th IS magnet 1821.

For example, at least one driving IC included in the 32nd magnet detection sensor 18331 may control a current passing through the 29th IS coil 1831 and change an electromagnetic force of the 29th IS coil 1831 so as to control the fourth IS carrier 1814 to move along the y-axis direction.

In an embodiment, at least one driving IC arranged outside the seventh camera actuator 1800 may control a current passing through the 29th IS coil 1831 and change an electromagnetic force of the 29th IS coil 1831 so as to control the fourth IS carrier 1814 to move along the y-axis direction.

In an embodiment, the 33rd magnet detection sensor 18332 may be arranged on a hole or a center of the 30th IS coil 1832. The 33rd magnet detection sensor 18332 may detect a distance between 30th IS coil 1832 and the 15th IS magnet 1821.

For example, at least one driving IC included in the 33rd magnet detection sensor 18332 may control a current passing through the 30th IS coil 1832 and change an electromagnetic force of the 30th IS coil 1832 so as to control the fourth IS carrier 1814 to move along the x-axis direction.

In an embodiment, at least one driving IC arranged outside the seventh camera actuator 1800 may control a current passing through the 30th IS coil 1832 and change an electromagnetic force of the 30th IS coil 1832 so as to control the fourth IS carrier 1814 to move along the x-axis direction.

In an embodiment, the 34th magnet detection sensor 18441 may be arranged between the 31st IS coil 1841 and the 32nd IS coil 1842. The 34th magnet detection sensor 18441 may be arranged in a neutral zone of the 16th IS magnet 1822.

In an embodiment, the 34th magnet detection sensor 18441 may detect a location of the 16th IS magnet 1822. For example, the 34th magnet detection sensor 18441 may detect a location of the 16th IS magnet 1822 with respect to the y-axis direction.

For example, in a case that the 16th IS magnet 1822 corresponds to a magnet having two poles (e.g., S pole-N pole) magnetized on one surface the magnet, the 34th magnet detection sensor 18441 may be arranged in an area facing the neutral area of the 16th IS magnet 1822.

For example, in a case that the 16th IS magnet 1822 corresponds to a magnet having three poles (e.g., N pole-S pole-N pole) magnetized on one surface of the magnet, the 34th magnet detection sensor 18441 may be arranged in an area facing the neutral area of the 16th IS magnet 1822.

For example, at least one driving IC included in the 34th magnet detection sensor 18441 may control a current passing through the 31st IS coil 1841 and change an electromagnetic force of the 31st IS coil 1841 so as to control the fourth IS carrier 1814 to move along the y-axis direction.

In an embodiment, at least one driving IC arranged outside the seventh camera actuator 1800 may control a current passing through the 31st IS coil 1841 and change an electromagnetic force of the 31st IS coil 1841 so as to control the fourth IS carrier 1814 to move along the y-axis direction.

In an embodiment, the 35th magnet detection sensor 18442 may be arranged on a hole or a center of the 32nd IS coil 1842. The 35th magnet detection sensor 18442 may detect a distance between 32nd IS coil 1842 and the 16th IS magnet 1822.

For example, at least one driving IC included in the 35th magnet detection sensor 18442 may control a current passing through the 32nd IS coil 1842 and change an electromagnetic force of the 32nd IS coil 1842 so as to control the fourth IS carrier 1814 to move along the x-axis direction.

In an embodiment, at least one driving IC arranged outside the seventh camera actuator 1800 may control a current passing through the 32nd IS coil 1842 and change an electromagnetic force of the 32nd IS coil 1842 so as to control the fourth IS carrier 1814 to move along the x-axis direction.

In an embodiment, the 29th IS coil 1831 and the 31st IS coil 1841 may be controlled by different driving ICs, respectively, to control a current passing through the coils so as to control the fourth IS carrier 1814 to move in the same direction and/or different directions. In a case that the 29th IS coil 1831 and the 31st IS coil 1841 are controlled by different driving ICs, respectively, to move the fourth IS carrier 1814 in the same direction, the fourth IS carrier 1014 may perform a linear movement along the y-axis. In a case that the 29th IS coil 1831 and the 31st IS coil 1841 are controlled by different driving ICs, respectively, in different directions, the fourth IS carrier 1814 may perform a rotation movement.

In an embodiment, in order to control the rotation movement and/or the linear movement of the fourth IS carrier 1814, the seventh camera actuator 1800 may further include Hall sensors in or adjacent to each of the 29th IS coil 1831 and the 31st IS coil 1841. For example, when a vertical distance between Hall sensors is L1 and a difference between movement distances detected by two Hall sensors is L2, a rotation angle of the fourth IS carrier 1814 may be arctan (L2/L1).

In an embodiment, the 30th IS coil 1832 and the 32nd IS coil 1842 may be controlled by different driving ICs, respectively, to control a current passing through the coils so as to control the fourth IS carrier 1814 to move in the same direction (e.g., the x axis). In a case that the 30th IS coil 1832 and the 32nd IS coil 1842 are controlled by different driving ICs, respectively, to move the fourth IS carrier 1814 in the same direction, the fourth IS carrier 1814 may perform a linear movement along the x-axis. In a case that the 30th IS coil 1832 and the 32nd IS coil 1842 are controlled by different driving ICs, respectively, in different directions, the fourth IS carrier 1814 may perform a rotation movement.

In an embodiment, in order to control the rotation movement and/or the linear movement of the fourth IS carrier 1814, the seventh camera actuator 1800 may further include Hall sensors in or adjacent to each of the 30th IS coil 1832 and the 32nd IS coil 1842. For example, when a vertical distance between Hall sensors is L1 and a difference between movement distances detected by two Hall sensors is L2, a rotation angle of the fourth IS carrier 1814 may be arctan (L2/L1).

In an embodiment, the 29th IS coil 1831 and the 31st IS coil 1841 may be controlled by the same driving IC (e.g., a 13th driving IC) to control a current passing through the coils so as to control the fourth IS carrier 1814 to move in the same direction and/or different directions. In a case that the 29th IS coil 1831 and the 31st IS coil 1841 are controlled by a driving ICs (e.g., the 13th driving IC) to move the fourth IS carrier 1814 in the same direction, the fourth IS carrier 1814 may perform a linear movement along the y-axis.

In an embodiment, the 30th IS coil 1832 and the 32nd IS coil 1842 may be controlled by the same driving IC (e.g., a 14th driving IC) to control a current passing through the coils so as to control the fourth IS carrier 1814 to move in the same direction (e.g., the x axis). In a case that the 30th IS coil 1832 and the 32nd IS coil 1842 are controlled by a driving ICs (e.g., the 14th driving IC) to move the fourth IS carrier 1814 in the same direction, the fourth IS carrier 1814 may perform a linear movement along the x-axis.

In an embodiment, the 36th magnet detection sensor 18551 may be arranged on a hole or a center of the fourth AF coil 1851. In a case that the fourth AF magnet 1823 corresponds to a magnet having two poles (e.g., S pole-N pole) magnetized on one surface of the magnet, the 36th magnet detection sensor 18551 may be arranged in an area facing the neutral area of the fourth AF magnet 1823.

In an embodiment, the 36th magnet detection sensor 18551 may detect a location of the fourth AF magnet 1823. For example, the 36th magnet detection sensor 18551 may detect a location of the fourth AF magnet 1823 with respect to the z-axis direction.

For example, at least one driving IC included in the 36th magnet detection sensor 18551 may control a current passing through the fourth AF coil 1851 and change an electromagnetic force of the fourth AF coil 1851 so as to control the fourth AF carrier 1815 to move along the z-axis direction.

In an embodiment, at least one driving IC arranged outside the seventh camera actuator 1800 may control a current passing through the fourth AF coil 1851 and change an electromagnetic force of the fourth AF coil 1851 so as to control the fourth AF carrier 1815 to move along the z-axis direction.

In an embodiment, an electronic device 101 including a camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may include a camera housing (e.g., the first camera housing 316, the second camera housing 516, the third camera housing 1016 and/or the fourth camera housing 1816), a lens assembly (e.g., the first lens assembly 311, the second lens assembly 511, the third lens assembly 1011 and/or the fourth lens assembly 1811) fixed to the camera housing (e.g., the first camera housing 316, the second camera housing 516, the third camera housing 1016 and/or the fourth camera housing 1816) and including at least one lens, an image stabilizer (IS) carrier (e.g., the first IS carrier 314, the second IS carrier 514, the third IS carrier 1014, and/or the fourth IS carrier 1814), an auto focus (AF) carrier (e.g., the first AF carrier 315, the second AF carrier 515, the third AF carrier 1015 and/or the fourth AF carrier 1815) coupled to the IS carrier (e.g., the first IS carrier 314, the second IS carrier 514, the third IS carrier 1014, and/or the fourth IS carrier 1814), an image sensor (e.g., the first image sensor 591, the second image sensor 1091, and/or the third image sensor 1891) coupled to the IS carrier (e.g., the first IS carrier 314, the second IS carrier 514, the third IS carrier 1014, and/or the fourth IS carrier 1814) to change a position of the image sensor based on a movement of the IS carrier (e.g., the first IS carrier 314, the second IS carrier 514, the third IS carrier 1014, and/or the fourth IS carrier 1814), a first IS magnet (e.g., the first IS magnet 321, the third IS magnet 521, the fifth IS magnet 1021, and/or the 15th IS magnet 1821) disposed on a first lateral surface of the IS carrier (e.g., the first IS carrier 314, the second IS carrier 514, the third IS carrier 1014, and/or the fourth IS carrier 1814), a second IS magnet (e.g., the second IS magnet 322, the fourth IS magnet 522, the sixth IS magnet 1022, and/or the 16th IS magnet 1822) disposed on a second lateral surface of the IS carrier (e.g., the first IS carrier 314, the second IS carrier 514, the third IS carrier 1014, and/or the fourth IS carrier 1814) parallel to the first lateral surface, and at least one coil (e.g., the first IS coil 331, the second IS coil 332, the third IS coil 341, the fourth IS coil 342, the fifth IS coil 531, the sixth IS coil 532, the seventh IS coil 541, the eighth IS coil 542, the ninth IS coil 1031, the tenth IS coil 1032, the 11th IS coil 1041, the 12th IS coil 1042, the 29th IS coil 1831, the 30th IS coil 1832, the 31st IS coil 1841 and/or the 32nd IS coil 1842) surrounding the camera housing (e.g., the first camera housing 316, the second camera housing 516, the third camera housing 1016 and/or the fourth camera housing 1816) and changing an electromagnetic force of the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822) by using a current.

In an embodiment, the AF carrier (e.g., the first AF carrier 315, the second AF carrier 515, the third AF carrier 1015 and/or the fourth AF carrier 1815) may include the AF magnet (e.g., the first AF magnet 323, the second AF magnet 523, the third AF magnet 1023, and/or the fourth AF magnet 1823) on a third lateral surface perpendicular to a first lateral surface direction of the IS carrier (e.g., the first IS carrier 314, the second IS carrier 514, the third IS carrier 1014, and/or the fourth IS carrier 1814).

In an embodiment, the at least one coil (e.g., the first IS coil 331, the second IS coil 332, the third IS coil 341, the fourth IS coil 342, the fifth IS coil 531, the sixth IS coil 532, the seventh IS coil 541, the eighth IS Coil 542, the ninth IS coil 1031, the tenth IS coil 1032, the 11th IS coil 1041, the 12th IS coil 1042, the 29th IS coil 1831, the 30th IS coil 1832, the 31st IS coil 1841 and/or the 32nd IS coil 1842) may include a first IS coil arranged on a surface corresponding to the first IS magnet (e.g., the first IS magnet 321, the third IS magnet 521, the fifth IS magnet 1021, and/or the 15th IS magnet 1821), the second IS coil arranged on a surface corresponding to the first IS magnet (e.g., the first IS magnet 321, the third IS magnet 521, the fifth IS magnet 1021, and/or the 15th IS magnet 1821), the third IS coil arranged on a surface corresponding to the second IS magnet (e.g., the second IS magnet 322, the fourth IS magnet 522, the sixth IS magnet 1022, and/or the 16th IS magnet 1822), and the fourth IS coil arranged on a surface corresponding to the second IS magnet (e.g., the second IS magnet 322, the fourth IS magnet 522, the sixth IS magnet 1022, and/or the 16th IS magnet 1822).

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may include three or more magnet detection sensors from among a first magnet detection sensor arranged in a neutral area of the first IS magnet (e.g., the first IS magnet 321, the third IS magnet 521, the fifth IS magnet 1021, and/or the 15th IS magnet 1821) and configured to detect a position of the first IS magnet (e.g., the first IS magnet 321, the third IS magnet 521, the fifth IS magnet 1021, and/or the 15th IS magnet 1821), a second magnet detection sensor arranged on a hole or a center of the second IS coil and configured to detect a distance of the first IS magnet (e.g., the first IS magnet 321, the third IS magnet 521, the fifth IS magnet 1021, and/or the 15th IS magnet 1821), a third magnet detection sensor arranged on a neutral area of the second IS magnet (e.g., the second IS magnet 322, the fourth IS magnet 522, the sixth IS magnet 1022, and/or the 16th IS magnet 1822) and configured to detect a location of the second IS magnet (e.g., the second IS magnet 322, the fourth IS magnet 522, the sixth IS magnet 1022, and/or the 16th IS magnet 1822), or a fourth magnet detection sensor arranged on a hole or a center of the fourth IS coil and configured to detect a distance of the second IS magnet (e.g., the second IS magnet 322, the fourth IS magnet 522, the sixth IS magnet 1022, and/or the 16th IS magnet 1822).

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may include a first driving integrated circuit (IC) configured to control a current of the first IS coil, a second driving IC configured to control a current of the second IS coil, a third driving IC configured to control a current of the third IS coil, and a fourth driving IC configured to control a current of the fourth IS coil.

In an embodiment, the first IS coil and the second IS coil may be controlled by corresponding driving ICs, respectively, or controlled by one of the first driving IC or the second driving IC.

In an embodiment, the third IS coil and the fourth IS coil may be controlled by corresponding driving ICs, respectively, or controlled by one of the third driving IC or the fourth driving IC.

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may include an AF coil (e.g., the first AF coil 351, the second AF coil 551, the third AF coil 1051, and/or the fourth AF coil 1851) arranged on a surface corresponding to the AF magnet (e.g., the first AF magnet 323, the second AF magnet 523, the third AF magnet 1023, and/or the fourth AF magnet 1823), and a fifth magnet detection sensor arranged on a hole of the AF coil (e.g., the first AF coil 351, the second AF coil 551, the third AF coil 1051, and/or the fourth AF coil 1851) and configured to detect a location of the AF magnet (e.g., the first AF magnet 323, the second AF magnet 523, the third AF magnet 1023, and/or the fourth AF magnet 1823).

In an embodiment, the IS carrier (e.g., the first IS carrier 314, the second IS carrier 514, the third IS carrier 1014, and/or the fourth IS carrier 1814) may be moved in a first direction and/or a second direction according to an electromagnetic force of the first IS magnet (e.g., the first IS magnet

321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822), and the first direction (e.g., the x-axis direction) may be perpendicular to the second direction (e.g., the y-axis direction).

In an embodiment, the IS carrier (e.g., the first IS carrier 314, the second IS carrier 514, the third IS carrier 1014, and/or the fourth IS carrier 1814) may perform a rotation movement on a plane on which the first direction (e.g., the x-axis direction) and the second direction (e.g., the y-axis direction) are perpendicular to each other, according to an electromagnetic force of the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822).

In an embodiment, the AF carrier (e.g., the first AF carrier 315, the second AF carrier 515, the third AF carrier 1015, and/or the fourth AF carrier 1815) may move in a third direction (e.g., the z-axis direction) perpendicular to the plane on which the first direction (e.g., the x-axis direction) and the second direction (e.g., the y-axis direction) are perpendicular to each other.

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may further include multiple IS balls (e.g., the first multiple IS balls 381, the second multiple IS balls 581, the third multiple IS balls 1081, and/or the fourth multiple IS balls 1881) between the IS carrier (e.g., the first IS carrier 314, the second IS carrier 514, the third IS carrier 1014, and/or the fourth IS carrier 1814) and the AF carrier (e.g., the first AF carrier 315, the second AF carrier 515, the third AF carrier 1015, and/or the fourth AF carrier 1815).

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may further include multiple AF balls (e.g., the first multiple AF balls 371, the second multiple AF balls 571, the third multiple AF balls 1071, and/or the fourth multiple AF balls 1871) between the AF carrier (e.g., the first AF carrier 315, the second AF carrier 515, the third AF carrier 1015, and/or the fourth AF carrier 1815) and the camera housing (e.g., the first camera housing 316, the second camera housing 516, the third camera housing 1016, and/or the fourth camera housing 1816).

In an embodiment, the electronic device 101 including the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may further include a reflection member including at least one reflection surface, which is located between the lens assembly (e.g., the first lens assembly 311, the second lens assembly 511, the third lens assembly 1011, and/or the fourth lens assembly 1811) and the image sensor (e.g., the first image sensor 591, the second image sensor 1091, and/or the third image sensor 1891) to configure an optical path so that light having passed through the lens assembly (e.g., the first lens assembly 311, the second lens assembly 511, the third lens assembly 1011, and/or the fourth lens assembly 1811) is oriented toward the image sensor (e.g., the first image sensor 591, the second image sensor 1091, and/or the third image sensor 1891).

In an embodiment, at least one surface of the IS carrier (e.g., the first IS carrier 314, the second IS carrier 514, the third IS carrier 1014, and/or the fourth IS carrier 1814) and the AF carrier (e.g., the first AF carrier 315, the second AF carrier 515, the third AF carrier 1015, and/or the fourth AF carrier 1815) may further include an opening in which the reflection member is received.

In an embodiment, the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822) may correspond to a magnet including three poles or two poles magnetized on one surface of the magnet.

In an embodiment, the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822) may include polarities facing each other.

In an embodiment, the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822) may include polarities which may be point symmetrical to each other.

In an embodiment, the lens assembly (e.g., the first lens assembly 311, the second lens assembly 511, the third lens assembly 1011, and/or the fourth lens assembly 1811) may be coupled to the IS carrier (e.g., the first IS carrier 314, the second IS carrier 514, the third IS carrier 1014, and/or the fourth IS carrier 1814) so as to change a location of the lens assembly based on a movement of the IS carrier (e.g., the first IS carrier 314, the second IS carrier 514, the third IS carrier 1014, and/or the fourth IS carrier 1814).

In an embodiment, the image sensor (e.g., the first image sensor 591, the second image sensor 1091, and/or the third image sensor 1891) may be fixed to the camera housing (e.g., the first camera housing 316, the second camera housing 516, the third camera housing 1016, and/or the fourth camera housing 1816).

In an embodiment, the lens assembly (e.g., the first lens assembly 311, the second lens assembly 511, the third lens assembly 1011, and/or the fourth lens assembly 1811) may be controlled so as to suppress a rotation between the IS carrier (e.g., the first IS carrier 314, the second IS carrier 514, the third IS carrier 1014, and/or the fourth IS carrier 1814) and the AF carrier (e.g., the first AF carrier 315, the second AF carrier 515, the third AF carrier 1015, and/or the fourth AF carrier 1815) by at least one coil (e.g., the first IS coil 331, the second IS coil 332, the third IS coil 341, the fourth IS coil 342, the fifth IS coil 531, the sixth IS coil 532, the seventh IS coil 541, the eighth IS Coil 542, the ninth IS coil 1031, the tenth IS coil 1032, the 11th IS coil 1041, the 12th IS coil 1042, the 29th IS coil 1831, the 30th IS coil 1832, the 31st IS coil 1841, and/or the 32nd IS coil 1842) symmetrically arranged on the optical axis.

In an embodiment, a camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may include a camera housing (e.g., the first camera housing 316, the second camera housing 516, the third camera housing 1016 and/or the fourth camera housing 1816), a lens assembly (e.g., the first lens assembly 311, the second lens assembly 511, the third lens assembly 1011 and/or the fourth lens assembly 1811) fixed to the camera housing (e.g., the first camera housing 316, the second camera housing 516, the third camera housing 1016 and/or the fourth camera housing 1816) and including at least one lens, an image stabilizer (IS) carrier (e.g., the first IS carrier 314, the second IS carrier 514, the third IS carrier 1014, and/or the fourth IS carrier 1814), an auto focus (AF) carrier (e.g., the first AF carrier 315, the second AF carrier 515, the third AF carrier 1015 and/or the fourth AF carrier 1815) coupled to the IS carrier (e.g., the first IS carrier 314, the second IS carrier 514, the third IS carrier 1014, and/or the fourth IS carrier 1814), an image sensor (e.g., the first image sensor 591, the second image sensor 1091, and/or the third image sensor 1891) coupled to the IS carrier (e.g., the first IS carrier 314, the second IS carrier 514, the third IS carrier 1014, and/or the fourth IS carrier 1814) to change a location of the image sensor based on a movement of the IS carrier (e.g., the first IS carrier 314, the second IS carrier 514, the third IS carrier 1014, and/or the fourth IS carrier 1814), a first IS magnet (e.g., the first IS magnet 321, the third IS magnet 521, the fifth IS magnet 1021, and/or the 15th IS magnet 1821) disposed on a first lateral surface of the IS carrier (e.g., the first IS carrier 314, the second IS carrier 514, the third IS carrier 1014, and/or the fourth IS carrier 1814), a second IS magnet (e.g., the second IS magnet 322, the fourth IS magnet 522, the sixth IS magnet 1022, and/or the 16th IS magnet 1822) disposed on a second lateral surface of the IS carrier (e.g., the first IS carrier 314, the second IS carrier 514, the third IS carrier 1014, and/or the fourth IS carrier 1814) parallel to the first lateral surface, and at least one coil (e.g., the first IS coil 331, the second IS coil 332, the third IS coil 341, the fourth IS coil 342, the fifth IS coil 531, the sixth IS coil 532, the seventh IS coil 541, the eighth IS Coil 542, the ninth IS coil 1031, the tenth IS coil 1032, the 11th IS coil 1041, the 12th IS coil 1042, the 29th IS coil 1831, the 30th IS coil 1832, the 31st IS coil 1841, and/or the 32nd IS coil 1842) surrounding the camera housing (e.g., the first camera housing 316, the second camera housing 516, the third camera housing 1016 and/or the fourth camera housing 1816) and changing an electromagnetic force of the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822) by using a current.

In an embodiment, the IS carrier (e.g., the first IS carrier 314, the second IS carrier 514, the third IS carrier 1014, and/or the fourth IS carrier 1814) may move or perform a rotation movement in a first direction and/or a second direction according to an electromagnetic force of the first IS magnet (e.g., the first IS magnet 321, the third IS magnet 521, the fifth IS magnet 1021, and/or the 15th IS magnet 1821) and the second IS magnet (e.g., the second IS magnet 322, the fourth IS magnet 522, the sixth IS magnet 1022, and/or the 16th IS magnet 1822), and the first direction (e.g., the x-axis direction) may be perpendicular to the second direction (e.g., the y-axis direction) so as to configure a plane.

In an embodiment, the camera actuator (e.g., the first camera actuator 300, the second camera actuator 500, the third camera actuator 1000, the fourth camera actuator 1500, the fifth camera actuator 1600, the sixth camera actuator 1700, and/or the seventh camera actuator 1800) may further include a reflection member including at least one reflection surface, which is located between the lens assembly (e.g., the first lens assembly 311, the second lens assembly 511, the third lens assembly 1011, and/or the fourth lens assembly 1811) and the image sensor (e.g., the first image sensor 591, the second image sensor 1091, and/or the third image sensor 1891) to configure an optical path so that light having passed through the lens assembly (e.g., the first lens assembly 311, the second lens assembly 511, the third lens assembly 1011, and/or the fourth lens assembly 1811) is oriented toward the image sensor (e.g., the first image sensor 591, the second image sensor 1091, and/or the third image sensor 1891).

In an embodiment, at least one surface of the IS carrier (e.g., the first IS carrier 314, the second IS carrier 514, the third IS carrier 1014, and/or the fourth IS carrier 1814) and the AF carrier (e.g., the first AF carrier 315, the second AF carrier 515, the third AF carrier 1015, and/or the fourth AF carrier 1815) may further include an opening in which the reflection member is received.

In an embodiment, the lens assembly (e.g., the first lens assembly 311, the second lens assembly 511, the third lens assembly 1011, and/or the fourth lens assembly 1811) may be controlled so as to suppress a rotation between the IS carrier (e.g., the first IS carrier 314, the second IS carrier 514, the third IS carrier 1014, and/or the fourth IS carrier 1814) and the AF carrier (e.g., the first AF carrier 315, the second AF carrier 515, the third AF carrier 1015, and/or the fourth AF carrier 1815) by at least one coil (e.g., the first IS coil 331, the second IS coil 332, the third IS coil 341, the fourth IS coil 342, the fifth IS coil 531, the sixth IS coil 532, the seventh IS coil 541, the eighth IS Coil 542, the ninth IS coil 1031, the tenth IS coil 1032, the 11th IS coil 1041, the 12th IS coil 1042, the 29th IS coil 1831, the 30th IS coil 1832, the 31st IS coil 1841, and/or the 32nd IS coil 1842) symmetrically arranged on the optical axis.

The electronic device according to one or more embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

One or more embodiments of the disclosure and the terms used in the disclosure are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part of the single integrated component. For example, according to an embodiment, the "module" may be implemented in the form of an application-specific integrated circuit (ASIC).

One or more embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each element (e.g., a module or a program) of the above-described elements may include a single entity or multiple entities. According to one or more embodiments, one or more of the above-described elements may be omitted, or one or more other elements may be added. Alternatively or additionally, a plurality of elements (e.g., modules or programs) may be integrated into a single element. In such a case, according to one or more embodiments, the integrated element may still perform one or more functions of each of the plurality of elements in the same or similar manner as they are performed by a corresponding one of the plurality of elements before the integration. According to one or more embodiments, operations performed by the module, the program, or another element may be carried out sequentially, in parallel, repeatedly, or heuristically, or one or more of the operations may be executed in a different order or omitted, or one or more other operations may be added.

What is claimed is:

1. An electronic device comprising:

a camera housing;

a lens assembly fixed to the camera housing and comprising at least one lens;

an image stabilizer (IS) carrier;

an auto focus (AF) carrier coupled to the IS carrier;

an image sensor coupled to the IS carrier, wherein a location of the image sensor is changed based on a movement of the IS carrier;

a first IS magnet arranged on a first lateral surface of the IS carrier;

a second IS magnet arranged on a second lateral surface of the IS carrier, the second lateral surface being parallel to the first lateral surface; and at least one coil configured to surround the camera housing and change an electromagnetic force of the first IS magnet and the second IS magnet by using a current, wherein the lens assembly is controlled to suppress a rotation between the IS carrier and the AF carrier by using the at least one coil arranged on an optical axis, wherein a rotation center of the IS carrier coincides with the optical axis.

2. The electronic device of claim 1, wherein the AF carrier comprises an AF magnet on a third lateral surface that is perpendicular to the first lateral surface of the IS carrier.

3. The electronic device of claim 1, wherein the at least one coil comprises:

a first IS coil arranged on a first surface corresponding to the first IS magnet;

a second IS coil arranged on a second surface corresponding to the first IS magnet;

a third IS coil arranged on a third surface corresponding to the second IS magnet; and a fourth IS coil arranged on a fourth surface corresponding to the second IS magnet, and wherein the electronic device comprises at least three of:

a first magnet detection sensor including a hall sensor arranged on a neutral area of the first IS magnet and configured to detect a location of the first IS magnet;

a second magnet detection sensor including a hall sensor arranged on a hole or a center of the second IS magnet and configured to detect a distance of the first IS magnet;

a third magnet detection sensor including a hall sensor arranged on a neutral area of the second IS magnet and configured to detect a location of the second IS magnet; or a fourth magnet detection sensor including a hall sensor arranged on a hole or a center of the fourth IS coil and configured to detect a distance of the second IS magnet.

4. The electronic device of claim 3, further comprising:

a first driving integrated circuit (IC) configured to control a first current of the first IS coil;

a second driving IC configured to control a second current of the second IS coil;

a third driving IC configured to control a third current of the third IS coil; and a fourth driving IC configured to control a fourth current of the fourth IS coil, wherein the first IS coil and the second IS coil are controlled by the first driving IC and the second driving IC, respectively, or controlled by one of the first driving IC or the second driving IC, and wherein the third IS coil and the fourth IS coil are controlled by the first driving IC and the second driving IC, respectively, or controlled by one of the third driving IC or the fourth driving IC.

5. The electronic device of claim 2, comprising:

an AF coil arranged on a surface corresponding to the AF magnet; and a fifth magnet detection sensor including a hall sensor arranged on a hole of the AF coil and configured to detect a location of the AF magnet.

6. The electronic device of claim 1, wherein the IS carrier is configured to move in a first direction or a second direction, based on the electromagnetic force between the first IS magnet and the second IS magnet, and wherein the first direction is perpendicular to the second direction.

7. The electronic device of claim 6, wherein the IS carrier is configured to perform a rotation movement based on the electromagnetic force between the first IS magnet and the second IS magnet on a plane on which the first direction and the second direction are perpendicular to each other.

8. The electronic device of claim 6, wherein the AF carrier is configured to move in a third direction perpendicular to a plane on which the first direction and the second direction are perpendicular to each other.

9. The electronic device of claim 1, further comprising multiple IS balls arranged between the IS carrier and the AF carrier.

10. The electronic device of claim 1, further comprising multiple AF balls arranged between the AF carrier and the camera housing.

11. The electronic device of claim 1, further comprising a reflection member located between the lens assembly and the image sensor to configure an optical path, wherein light passed through the lens assembly is oriented toward the image sensor, and wherein the reflection member has at least one reflection surface.

12. The electronic device of claim 11, wherein at least one side surface of the IS carrier and the AF carrier further comprises an opening configured to receive the reflection member.

13. The electronic device of claim 1, wherein each of the first IS magnet and the second IS magnet corresponds to a magnet having three poles or two poles magnetized on one surface of the magnet.

14. The electronic device of claim 1, wherein a first polarity of the first IS magnet and a second polarity of the second IS magnet face each other, or the first polarity of the first IS magnet and the second polarity of the second IS magnet are point symmetrical to each other.

15. The electronic device of claim 1, wherein the lens assembly is coupled to the IS carrier and has a position changing based on a movement of the IS carrier, and wherein the image sensor is fixed to the camera housing.

16. A camera actuator comprising:

a camera housing;

a lens assembly fixed to the camera housing and comprising at least one lens;

an image stabilizer (IS) carrier;

an auto focus (AF) carrier coupled to the IS carrier;

an image sensor coupled to the IS carrier, wherein a location of the image sensor is changed based on a movement of the IS carrier;

a first IS magnet arranged on a first lateral surface of the IS carrier;

a second IS magnet arranged on a second lateral surface of the IS carrier, the second lateral surface being parallel to the first lateral surface; and at least one coil configured to surround the camera housing and change an electromagnetic force of the first IS magnet and the second IS magnet by using a current, wherein the lens assembly is controlled to suppress a rotation between the IS carrier and the AF carrier by using the at least one coil arranged on an optical axis, wherein a rotation center of the IS carrier coincides with the optical axis.

17. The camera actuator of claim 16, wherein the IS carrier is configured to move or perform a rotation movement in a first direction or a second direction based on the electromagnetic force between the first IS magnet and the second IS magnet, and wherein the first direction is perpendicular to the second direction.

18. The camera actuator of claim 16, further comprising a reflection member located between the lens assembly and the image sensor to configure an optical path, wherein light passed through the lens assembly is oriented toward the image sensor, wherein the reflection member has at least one reflection surface, and wherein at least one side surface of the IS carrier and the AF carrier further comprises an opening configure to receive the reflection member.

\* \* \* \* \*